United States Patent [19]
Kanamori

[11] Patent Number: 6,028,958
[45] Date of Patent: Feb. 22, 2000

[54] IMAGE PROCESSING APPARATUS HAVING IMAGE AREA RECOGNITION FUNCTION AND IMAGE PROCESSING METHOD

[75] Inventor: Keiko Kanamori, Kawasaki, Japan

[73] Assignee: Kabushiki Kaisha Toshiba, Kawasaki, Japan

[21] Appl. No.: 08/979,857

[22] Filed: Nov. 26, 1997

[30] Foreign Application Priority Data

Nov. 28, 1996 [JP] Japan ................................. 8-317774

[51] Int. Cl.⁷ .............................. G06K 9/00; G06K 9/34; G06K 9/40
[52] U.S. Cl. .......................... 382/171; 382/168; 382/173; 382/176; 382/274
[58] Field of Search .................................... 382/168, 170, 382/171, 173, 176, 270–273; 358/461, 462, 464, 467, 458

[56] References Cited

U.S. PATENT DOCUMENTS 4,903,145  2/1990  Funada ..................................... 358/462
4,929,979  5/1990  Kimoto et al. ............................ 358/38

FOREIGN PATENT DOCUMENTS 0 557 099     8/1993  European Pat. Off. ......... H04N 1/40
0 557 099 A1  8/1993  European Pat. Off. ......... H04N 1/40

Primary Examiner—Bijan Tadayon
Assistant Examiner—Dmitry A. Novik
Attorney, Agent, or Firm—Foley & Lardner

[57] ABSTRACT

An image processing apparatus comprises a scanner mechanism for fetching an image, a function of preparing a density histogram on the basis of the fetched image, a decision function of deciding a sort of the fetched image corresponding to a histogram distribution of a background area when the density histogram is divided into the background area and a character area having an image density higher than the background area, and a first image density frequency having a maximum frequency within a range of the background area, and a circuit for correcting a gradation of the fetched image, in accordance with a decision result of the decision function.

20 Claims, 19 Drawing Sheets

IMAGE PROCESSING APPARATUS HAVING IMAGE AREA RECOGNITION FUNCTION AND IMAGE PROCESSING METHOD

BACKGROUND OF THE INVENTION

The present invention relates to an image processing method in which image information is inputted by reading an image from an original document by a scanner or the like, for example, is subjected to predetermined image processing such as gradation correction or the like, and is thereafter outputted onto a paper sheet by a laser printer adopting an electronic photographing method, as well as an image processing apparatus such as a digital copying machine which uses the image processing method.

In general, in an image processing apparatus such as a digital copying machine dealing with image information, image information is read from an original document by a reading means such as a scanner or the like, converted into multi-value information, and digitized image information is processed in compliance with purposes and is outputted from an output means such as a laser printer or the like. This kind of apparatus has a density correcting function of automatically correcting the density in compliance with the original document without correcting the density by a density adjust button when the image information read by the scanner includes a background portion of the original document or characters on the original document are light in color.

Recently, as one of the density correcting function, a method has been proposed in which a density histogram is formed from inputted image information and the kind of an original document (or the kind of image information) inputted is decided from characteristic amounts concerning the density histogram, thereby to correct the gradation of the inputted image information in accordance with the decision result.

In order to correct the image density with use of characteristic amounts concerning an original document, it is important to exactly decide the kind of the original document (or the kind of image information). However, original documents includes a kind of character original document (or a character image), a kind of photographic original document (or photographic images), and others kinds of which cannot be easily decided, e.g., an original document including characters and pictures mixed therein, an original document including different kinds of backgrounds together, an original document including light-colored characters and deep- colored characters mixed therein, etc. Thus, there are many kinds of original documents which cannot be processed equally by only one data form, i.e., many original documents cannot be decided with respect to their kinds.

Particularly, for example, magazines often show such a photograph original document D as shown in FIG. 23, which includes a white band portion W1 having a density close to white in the periphery and characters having a background W2 surrounded thereby, as well as another background B having a color density deeper than the back ground W2. Note that P1 and P2 in FIG. 23 respectively denote a character image and an image other than characters.

This kind of original document, however, often cannot be recognized correctly, and the density of such a portion which needs to be reproduced is also often deleted. For example, in case where image information is obtained by reading the original document D shown in FIG. 23, the image density of the image information is corrected by the method described above, and is thereafter outputted in form of a hard copy by a laser printer. Consequently, an output image D' also shown in FIG. 23 is obtained, and a portion corresponding to the background B in FIG. 23 is not reproduced but deleted, as can be known from the example of the image D'.

BRIEF SUMMARY OF THE INVENTION

The present invention has an object of providing an image processing method and an image processing apparatus, which are capable of deciding the kind of inputted image information with a high precision and are capable of automatically correcting the gradation of the inputted image information on real time.

An image processing apparatus comprises a scanner mechanism for fetching an image, a function of preparing a density histogram on the basis of the fetched image, a decision function of deciding a sort of the fetched image corresponding to a histogram distribution of a background area when the density histogram is divided into the background area and a character area having an image density higher than the background area, and a first image density frequency having a maximum frequency within a range of the background area, and a circuit for correcting a gradation of the fetched image, in accordance with a decision result of the decision function.

According to the present invention, an image histogram is divided into two areas of a background area and a character area, and is analyzed in more details, depending on a distribution of a density histogram concerning the background area, thereby to decide the kind of image. Further, the kind of image is decided in consideration of a density value of the image density frequency of the maximum frequency in the background area and the frequency thereof. As a result of this, a very precise decision on areas can be made by making decisions on the areas in consideration of threshold values or the like depending on specific information, even if there are difficulties in making a simple decision as to whether an area is a photograph area or a character area. Therefore, it is possible to avoid such a trouble that a necessary background is deleted by erroneously deciding a photograph area as a character area.

Further, the method of the present invention realizes precise recognition concerning areas on the same grounds as described above.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, embodiments of the present invention will be explained with reference to the drawings.

Figure 1:
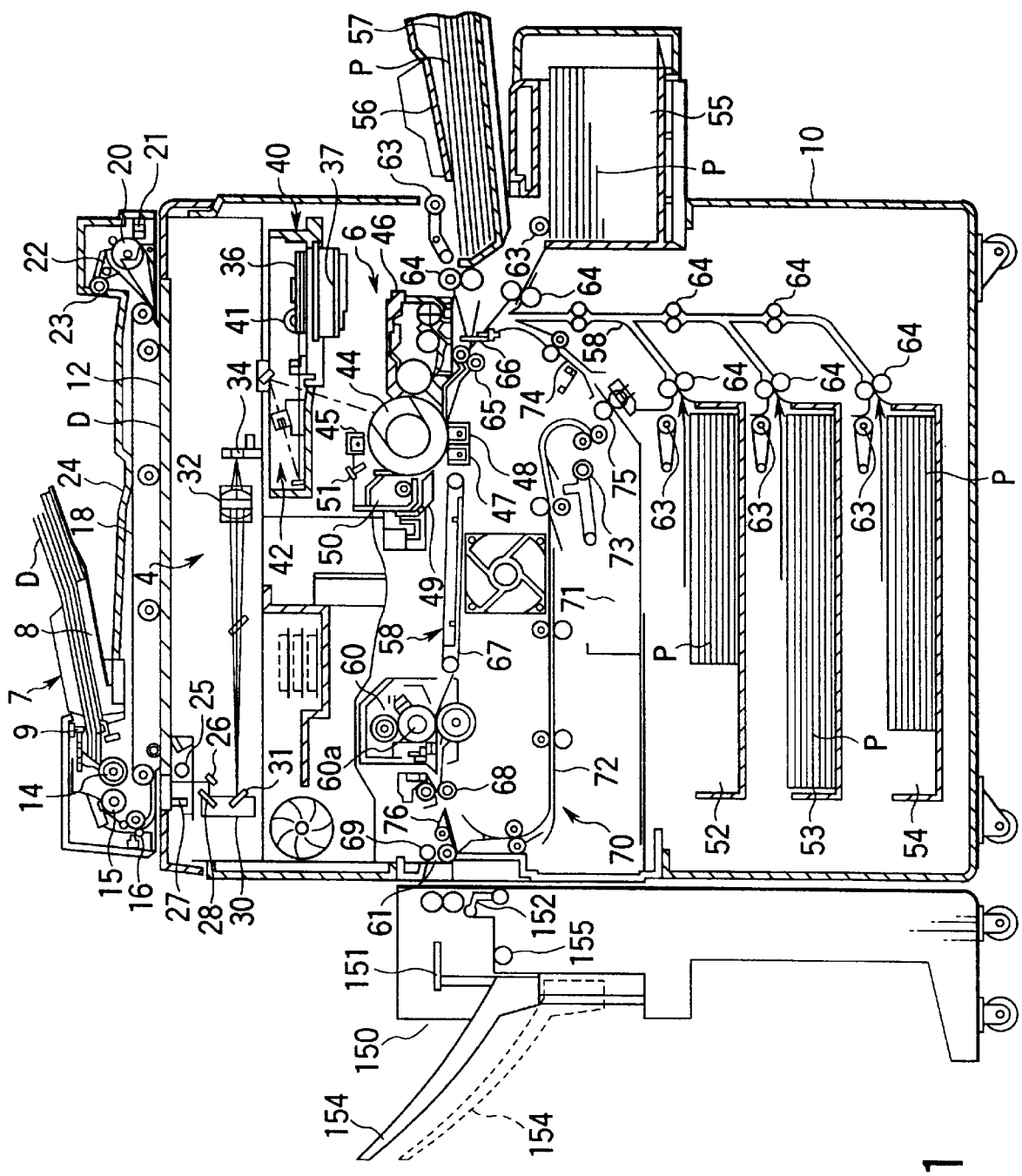
FIG. 1 is a side view showing an internal structure of a digital copying machine according to an embodiment of the present invention.

FIG. 1 shows an internal structure of a digital copying machine as an example of an image processing apparatus according to the present invention. This digital copying machine is, for example, a composite type copying machine having three functions as a copying machine, a facsimile, and a printer.

In FIG. 1, a reference 10 denotes an apparatus body which is internally provided with a scanner section 4 as an input means and a reading means as well as a printer section 6 as an output means and an image forming means.

On the upper surface of the apparatus body 10, there is provided an original document mount stage 12 made of transparent glass on which an original document D is set as a target object to be read. Also, on the upper surface of the apparatus body 10, there is provided an automatic original document feed device 7 (which will be referred to as only ADF 7 hereinafter) for automatically feeding the original document D. The ADF 7 is arranged such that the ADF can be opened and closed with respect to the original mount stage 12, and also functions as an original document presser for pressing the original document D set on the original document mount stage 12 into tight contact therebetween.

The ADF 7 comprises an original document tray 8 on which an original document D is set, an empty sensor 9 for detecting presence or absence of an original document, a pick-up roller 14 for picking up one after another of original documents D, a sheet feed roller 15 for conveying an original document D picked up, paired aligning rollers 16 for aligning the top end of the original document D, and a conveyer belt 18 provided so as to cover substantially the entire of the original document mount stage 12. A plurality of original documents set on the original tray 8 with their surfaces facing upwards are picked up, one after another, in an order from the last page thereof, and are aligned by the paired aligning rollers 16, also one after another. Thereafter, the original documents D are conveyed, one after another, to a predetermined position on the original document mount stage 12 by the conveyer belt 18.

In the ADF 7, a reverse roller 20, a non-reverse sensor 21, a flapper 22, and a feed-out roller 23 are provided at the end portion of the ADF 7 opposite to the paired aligning rollers 16 with the conveyer belt 18 inserted therebetween. An original document D from which image information has been read is fed out from the original document mount stage 12 by the conveyer belt 18, and is then fed out onto an original document feed-out section 24 on the upper surface of the ADF 7 by the feed-out roller 22. In case of reading the back surface of the original document D, the original document D conveyed by the conveyer belt 18 is reversed by the reverse roller 20 by switching the flapper 22, and is thereafter fed again to the predetermined position on the original document mount stage 12 by the conveyer belt 18.

The scanner section 4 provided in the apparatus body 10 has an exposure lamp 25 as a light source for illuminating an original document D set on the original document mount stage 12 and a first mirror 26 for reflecting reflection light from the original document D, and the exposure lamp 25 and the first mirror 26 are installed on a first carriage 27 provided below the original document mount stage 12. The first carriage 27 is provided to be movable in parallel with the original document mount stage 12, and is reciprocally moved below the original document mount stage 12 by a drive motor through a toothed belt not shown.

A second carriage 28 movable in parallel with the original document mount stage 12 is provided below the original document mount stage 12. Second and third mirrors 30 and 31 for reflecting successively reflection light reflected by the original document D are installed on the second carrier such that the mirrors are perpendicular to each other. The second carriage 28 is moved so as to follow the first carriage 27 by a toothed belt or the like for driving the first carriage 27 and is moved in parallel with the original document mount stage 12 at a speed of ½ of the first carriage.

Below the original document mount stage 12, there are provided an imaging lens 32 for converging reflection light from the third mirror 31 on the second carriage 28 and a line sensor 34 of CCD type as a photoelectric conversion means for receiving and photoelectrically converting the light converged by the imaging lens 32. The imaging lens 32 is provided in a plane including the optical axis of the light reflected by the third mirror 31 such that the imaging lens 32 can be moved by a driving mechanism. The imaging lens 32 itself moves thereby to form an image at a desired expansion (or magnification) ratio. Further, the line sensor 34 photoelectrically converts the reflection light inputted and outputs an electric signal corresponding to the original document D read out.

Meanwhile, a printer section 6 comprises a laser exposure device 40 as a latent image forming means. The laser exposure device 40 comprises a semiconductor laser oscillator 41 as a light source, a polygon mirror 36 as a scanning member for sequentially deflecting a laser beam injected from the semiconductor laser oscillator 41, a polygon motor 37 as a scanning motor for rotating and driving the polygon mirror 36 at a predetermined rotation speed described later, and an optical system 42 for deflecting and introducing the laser beam from the polygon mirror 36 to a photosensitive drum 44 also described later. A laser exposure device 40 constructed in a structure as described above is fixed and supported on a support frame of the apparatus body 10, not shown.

The semiconductor laser oscillator 41 is controlled to be turned on and off in accordance with image information read from an original document D by the scanner section 4 or in accordance with facsimile transmission character information, and a laser beam from the oscillator 41 is directed to a photosensitive drum 44 by a polygon mirror 36 and an optical system 42. The circumferential surface of the photosensitive drum 44 is exposed to and scanned by the laser beam, thereby forming an electrostatic latent image.

The printer section 6 has a rotatable photosensitive drum 44 as an image carrier which is provided in the substantial center of the apparatus body 10, and the circumferential surface of the photosensitive drum 44 is exposed and scanned with a laser beam from a laser exposure device 40, thereby to form an electrostatic latent image. Around the photosensitive drum 44, there are provided an electrification charger 45 for electrifying the circumferential surface of the photosensitive drum 44 to a predetermined electric charge, a developer 46 as a developing means for supplying a toner as a developing agent onto an electrostatic latent image formed on the photosensitive drum 44 thereby to perform a development with a desired image density, a separation charger 47 for separating a paper sheet P as a medium on which an image is formed and which is supplied by a sheet feed cassette, from the photosensitive drum, a transfer charger 48 for transferring a toner image formed on the photosensitive drum 44 to a paper sheet P, a separation nail 49 for separating a paper sheet from the circumferential surface of the photosensitive drum 44, a cleaning device 50 for cleaning a toner remaining on the circumferential surface of the photosensitive drum 44, and a discharger 51 for discharging charges from the circumferential surface, in this order.

An upper sheet feed cassette 52, a middle sheet feed cassette 53, and a lower sheet feed cassette 54, which can be drawn out of the apparatus body 10, are layered at a lower portion of the apparatus body 10, and the sheet feed cassettes 52 to 54 are respectively filled with paper sheets P having sizes different from each other. In the side of these cassettes 52 to 54, a large capacity feeder 55 is provided and contains about 3000 paper sheets P of a size of, for example, A4 which are used very frequently. In addition, a sheet feed cassette 57 which serves also as a manual insertion tray 56 is detachably attached above the large-capacity feeder 55.

In the apparatus body 10, a convey path 58 is formed which extends through a transfer section positioned between the photosensitive drum 44 and the transfer charger 48 from the sheet feed cassettes 52 to 54 and the large capacity feeder 55. A fixing device 60 having a fixing lamp 60 a is provided at an end of the convey path 58. An feed-out port 61 is formed in the side wall of the apparatus body 10 opposite to the fixing device 60 and the feed-out port 61 is equipped with a finisher of a single tray.

Pick-up rollers 63 are respectively provided near the upper sheet feed cassette 52, the middle sheet feed cassette 53, the lower sheet feed cassette 54, the sheet feed cassette 57, and the large capacity feeder 55, and each of the pick-up rollers 63 picks up paper sheets P, one after another, from corresponding one of the sheet feed cassette 52, 53, 54, and 57 and the large capacity feeder 55. The convey path 58 is provided with a plurality of pairs of sheet feed rollers 64 each pair of which convey a paper sheet P picked up by a pick-up roller 63.

A pair of resist rollers 65 are provided in the upstream side of the convey path 58 with respect to the photosensitive drum 44. The pair of resist rollers 65 correct an inclination of a paper sheet P picked up, align the top end of the paper sheet P with the top end of a toner image on the photosensitive drum 44, and feed the paper sheet P to the transfer section at the same speed as the moving speed of the circumferential surface of the photosensitive drum 44. In the side of the pair of resist roller 65 which is close to the sheet feed rollers 64, an aligning pre-sensor 66 is provided for detecting an arrival of the paper sheet P.

Paper sheets P picked up by a pick-up roller 63 from one of the sheet feed cassettes 52 to 54 and 57 and the large capacity feeder 55 are fed to the pair of resist rollers 65 by the pair of sheet feed rollers 64. Every paper sheet P is subjected to an alignment of its top end by the resist rollers 65 and is thereafter fed to the transfer section.

In the transfer section, a developer image formed on the photosensitive drum 44, i.e., a toner image is transferred onto a paper sheet P by the transfer charger 48. The paper sheet P onto which the toner image has been transferred is separated off from the circumferential surface of the photosensitive drum 44 by operation of the separation charger 47 and the separation nail 49, and is conveyed to the fixing device 60 by a conveyer belt 67 forming part of the convey path 52. Further, the developer image is melted and fixed onto the paper sheet P, and thereafter, the paper sheet P is fed out onto a finisher 150 through a feed-out port 61 by the pair of sheet feed rollers 68 and the pair of feed-out rollers 69.

Below the convey path 58, an automatic double side device 70 for reversing the paper sheet P which has passed through the fixing device 60 and for feeding the sheet P again to the pair of the resist rollers 65 is provided below the convey path 58. The automatic double side device 70 comprises a temporary stock section 71 for temporarily stocking paper sheets P, a reverse path 72 branched from the convey path 58 to reverse a paper sheet P which has passed through the fixing device 60 and to guide the paper sheet to the temporary stock section 71, a pick-up roller 73 for picking up one after another of paper sheets P stocked in the temporary stock section 71, and a sheet feed roller 75 for feeding a picked up paper sheet P to a pair of resist rollers 65 through a convey path 74. At a branch section between the convey path 58 and the reverse path 72, there is provided a distribution gate 76 for selectively distribute paper sheets P to the feed-out port 61 or the reverse path 72.

In case of performing double side copying, a paper sheet P which has passed through the fixing device 60 is fed to the reverse path 72 by the distribution gate 72 and is compiled and temporarily compiled at the temporary stock section 71. Thereafter, the paper sheet P is fed to the pair of resist rollers 65 through the convey path 74 by the pick-up roller 73 and the pair of sheet feed rollers 75. Further, the paper sheet P is aligned by the pair of resist rollers 65 and is thereafter fed to a transfer section where a toner image is transferred onto the back surface of the paper sheet P. Subsequently, the paper sheet P is fed out to the finisher 150 through the convey path 58, the fixing device 60, and the feed out roller 69.

The finisher 150 serves to staple a set of documents fed out in units of sets. Every time when a paper sheet P to be stapled is fed out from the feed out port 61, the paper sheet P is aligned so as to match with the side where stapling is performed. After all the paper sheets P are fed out, a sheet press arm 152 presses a unit set of paper sheets P fed out, and a stapler unit (not shown) carries out stapling.

Thereafter, a guide bar 151 moves down and paper sheets P stapled are fed out, in units of sets, onto a finisher feed out tray 154 by a finisher feed out roller 155. The amount by which the finisher feed out tray 154 moves down is decided to some extent by the number of paper sheets P to be fed out, and moves down by one step every time when a set of paper sheets are fed out. The guide bar 151 for aligning paper sheets P to be fed out is positioned at a height at which the guide bar 151 does not have a contact with paper sheets P stapled already and put on the finisher feed out tray 154.

The finisher feed out tray 154 is connected to a shift mechanism (not shown) for shifting every set of paper sheets (for example, in the four directions of forward, backward, leftward, and rightward directions).

Note that an upper portion of the apparatus body 10 is provided with an operation panel 80 (not shown) for inputting a copy start command for starting various copy conditions and copy operations and for displaying a operating state.

Figure 2:
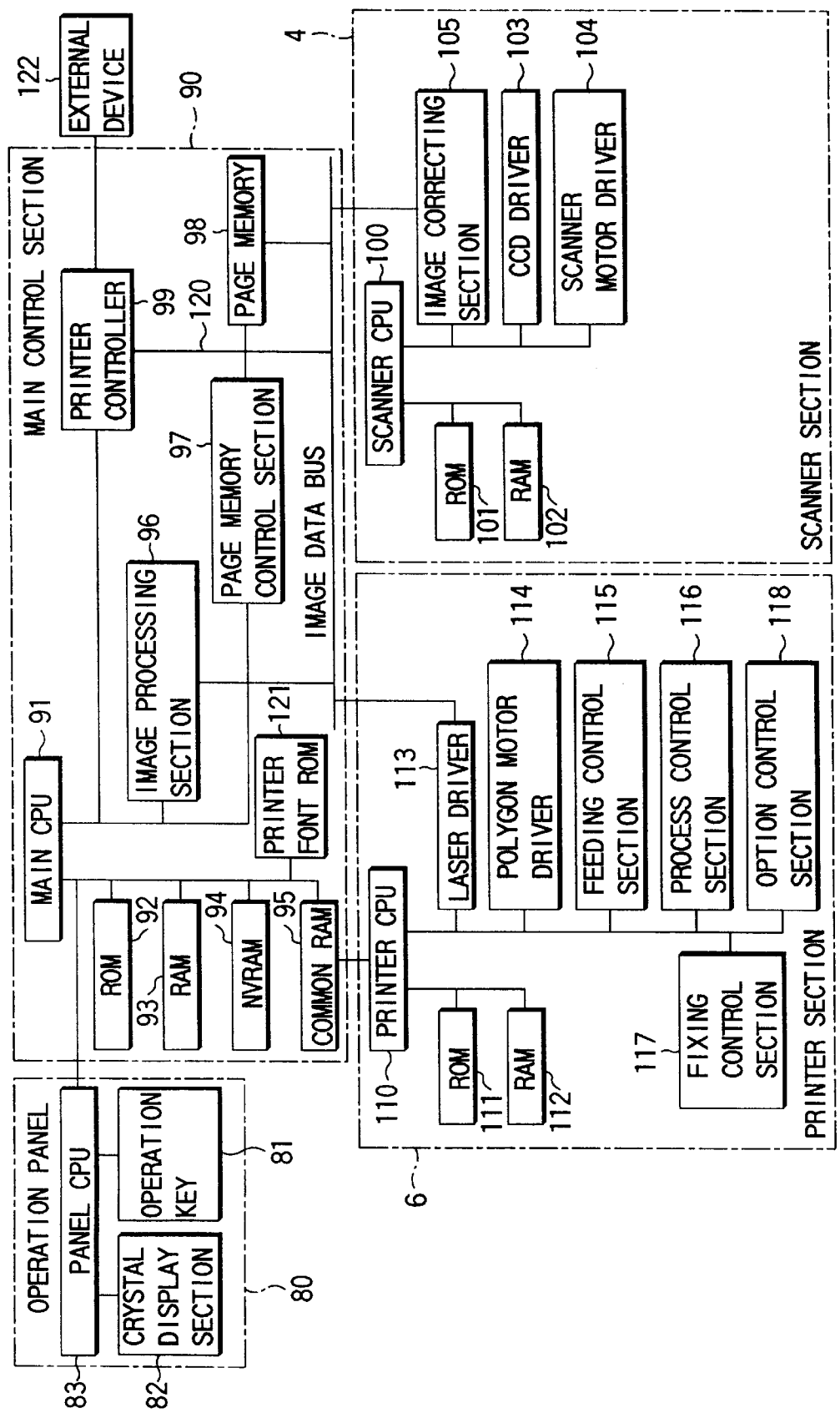
FIG. 2 is a block diagram schematically showing electric connections and flows of signals used for controlling the machine.
Figure 3:
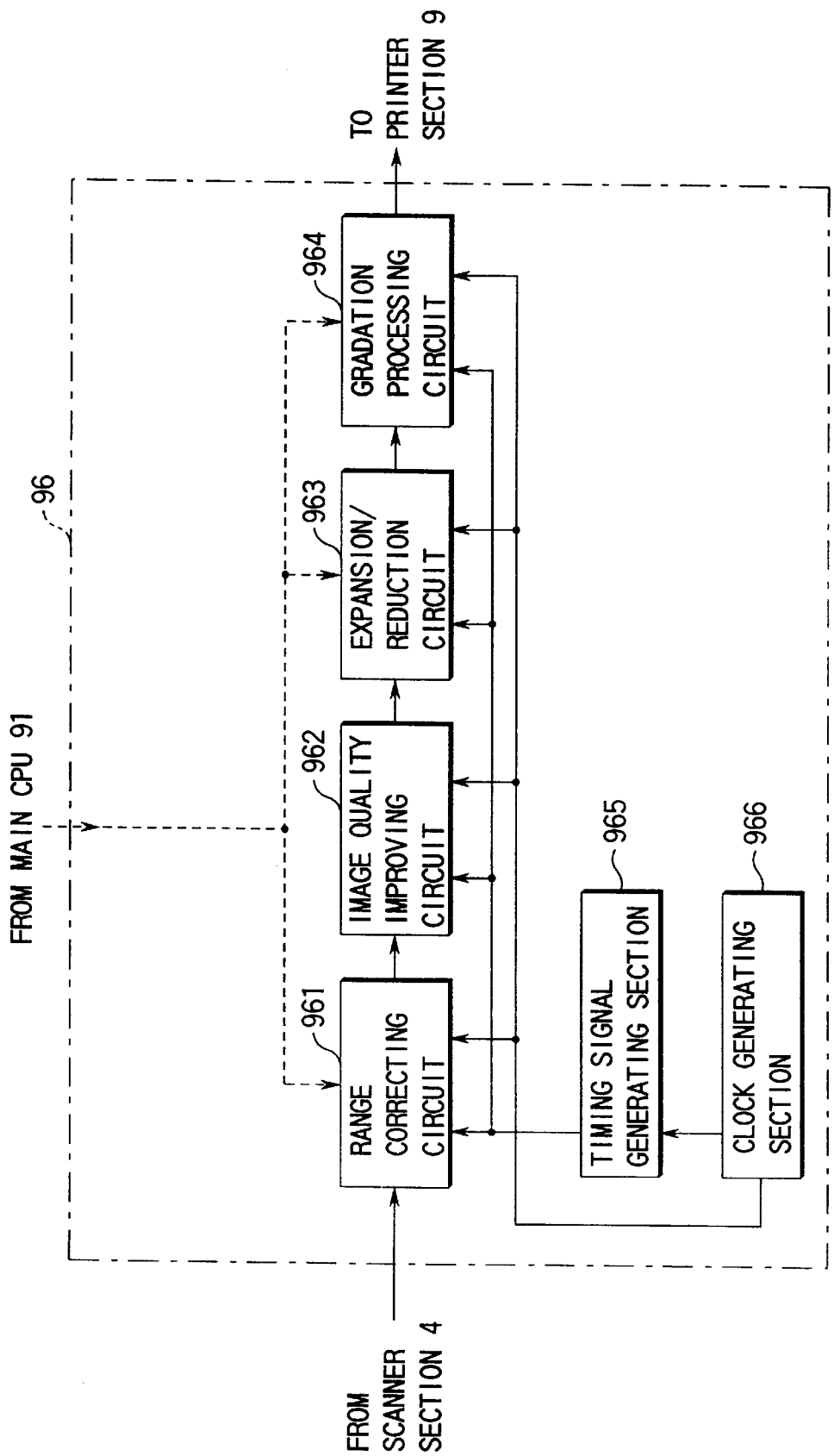
FIG. 3 is a block diagram schematically showing a structure of an image processing section.

FIG. 2 is a block diagram schematically showing electric connections in the digital copying machine shown in FIG. 1 and flows of signals thereof. In FIG. 2, a control system consists of three CPUs (Central Processing Units), i.e., a main CPU 91 in a main control section 90, a scanner CPU 100 of a scanner section 4, and a printer CPU 110 of a printer section 6.

The main CPU 91 serves to perform a bi-directional communication, and the main CPU 91 generates operation instructions while the printer CPU 110 returns a status. The printer CPU 119 and the scanner CPU 100 execute serial communications and the printer CPU generates an operation instruction while the scanner CPU 100 returns a status.

The operation panel 80 has various operation keys 81, a crystal display section 82, and a panel CPU 83, and is connected to the main CPU 91.

The main control section 90 consists of a main CPU 91, a ROM 92, a RAM 93, a NVRAM 94, a common RAM 95, an image processing section 96, a page memory control section 97, a page memory 98, a printer control 99, and a printer font ROM 121.

The main CPU 91 manages total control. The ROM 92 stores control programs or the like. The RAM 93 temporarily stores information.

The NVRAM (Non-Volatile RAM) 94 is a non-volatile memory backed up by a battery (not shown) and maintains stored data when the power is cut off.

The common RAM 95 is used to perform a bi-directional communication between the main CPU 91 and the printer CPU 110.

The page memory control section 97 stores and reads image information with respect to the page memory 98. The page memory 98 has an area capable of storing image information equivalent to a plurality of pages and is formed to be capable of storing data obtained by compressing image information from the scanner section 4 in units of pages.

The printer font ROM 121 stores font data corresponding to print data. The printer control 99 serves to develop the print data from an external device such as a personal computer or the like, in form of image data at a resolution corresponding to data representing a resolution applied to printing data, with use of font data stored in the printer font ROM 121.

The scanner section 4 consists of a scanner CPU 100 which manages total control, a ROM 101 storing control programs or the like, a RAM 102 for storing data, a CCD driver 103 for driving a line sensor 34, a scanner motor driver 104 for controlling rotation of a scanner motor for moving an exposure lamp 25 and mirrors 26, 27, and 28 or the like, and an image correcting section 105.

The image correcting section 105 consists of an A/D converter circuit for converting an analogue signal from the line sensor 34 into a digital signal, a shading correcting circuit for correcting changes of a threshold level with respect to an output signal from the line sensor 34, caused by the variance of the line sensor 34 or environmental temperature changes, and a line memory for temporarily storing a digital signal subjected to a shading correction from the shading correcting circuit.

The printer section 6 consists of a printer CPU 110 for managing total control, a ROM 111 storing control programs or the like, a RAM 112 for storing data, a laser driver 113 for driving a semiconductor laser oscillator 41, a polygon motor driver 114 for driving the polygon motor 27 of the laser exposure device 40, a feeding control section 115 for controlling feeding of paper sheets P through the convey path 58, a process control section 116 for controlling the process of charging, developing, and transferring with use of an electrification charger 45, a developing device 46, and a transfer charger 48, a fixing control section 117 for controlling the fixing device 60, and an option control section 118 for controlling options.

Note that the page memory 98, printer control 99, the image correcting section 105, and the laser driver 113 are connected with each other by an image data bus 120.

The image processing section 96 serves to perform various image processing with respect to image information read by the scanner section 4, and for example, consists of a range correcting circuit 961, an image quality improving circuit 962, an expansion/reduction circuit 963, a gradation processing circuit 964, a timing signal generating section 965, and a clock generating section 966.

The range correcting circuit 961 corrects the range of a density with respect to image information inputted, as will be specifically described later. The image quality improving circuit 962 performs image quality improving processing with respect to image information from the range correcting circuit 961. The expansion/reduction circuit 963 performs expansion/reduction processing on image information from the image quality improving circuit 962, whose image quality has been improved. The gradation processing circuit 964 performs gradation processing on image information from the expansion/reduction circuit 963.

The timing signal generating section 965 generates various timing signals and supplies the timing signals to the range correcting circuit 961, the image quality improving circuit 962, the expansion/reduction circuit 963, and the gradation processing circuit 964.

The clock generating section 966 generates various clock signals and supplies the clock signals to the range correcting circuit 961, the image quality improving circuit 962, the expansion/reduction circuit 963, the gradation processing circuit 964, and the timing signal generating section 965.

Figure 4:
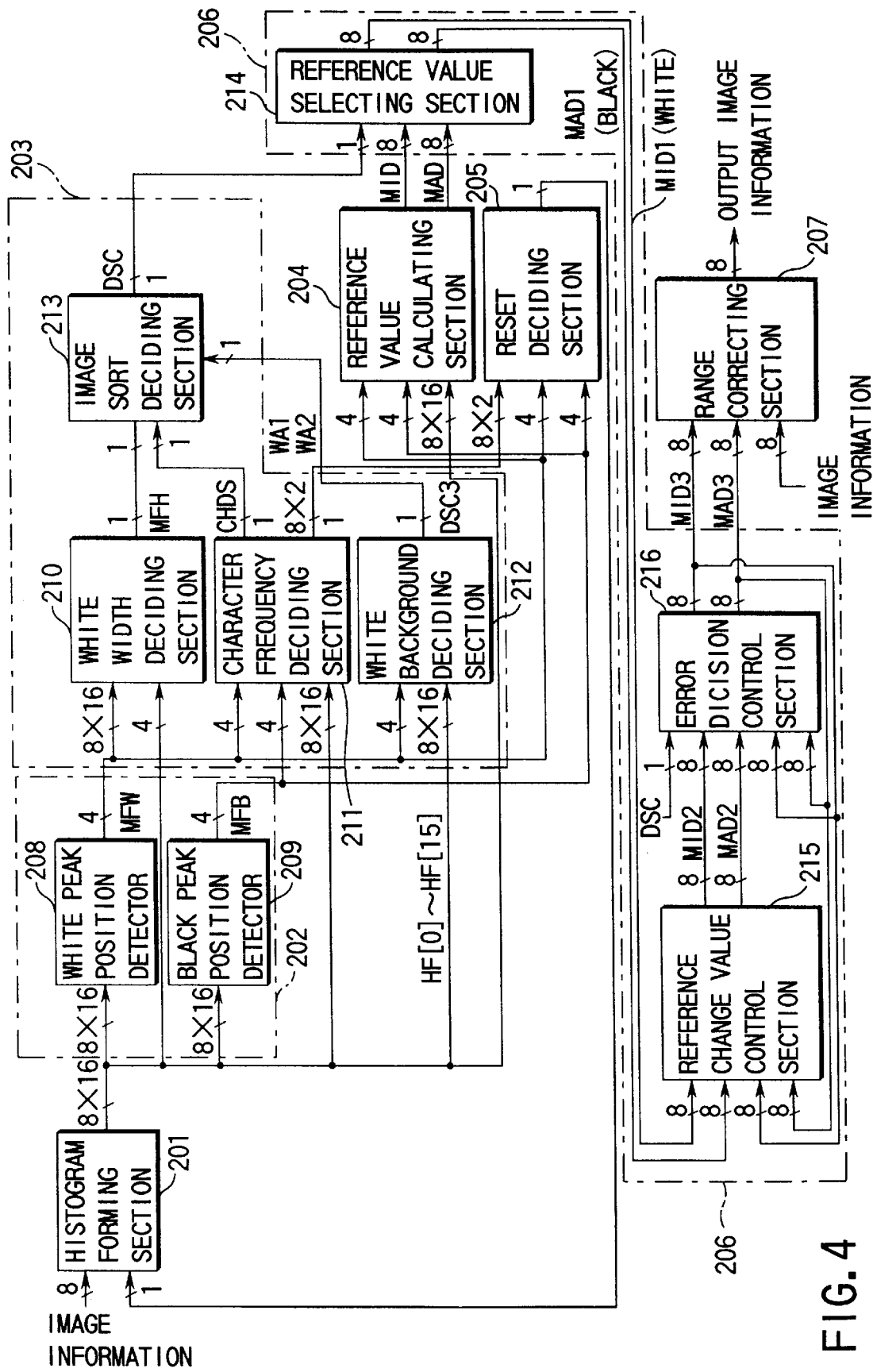
FIG. 4 is a block diagram specifically showing a structure of a range correcting circuit.

FIG. 4 shows a structure of the range correcting circuit 961 in details. Specifically, the range correcting circuit 961 consists of a histogram forming section 201 as a histogram forming means for preparing a density histogram from image information supplied from the scanner section 4, a peak position detecting section 202 as a peak position detecting means, an image sort deciding section 203 as an image sort deciding means, a reference value calculating section 204 as a reference value calculating means, a reset deciding section 205, a reference value selecting section 206 as a reference value selecting means, and a range correcting section 207 as a gradation correcting means.

The peak position detecting section 202 serves to detect two peak positions of a density histogram formed by the histogram forming section and consists of a white peak position detector 208 and a black peak position detector 209.

The white peak position detector 208 detects a position of a white peak from a density histogram formed by the histogram forming section 201 and the black peak position detector 209 detects a position of a black peak from a density histogram formed by the histogram forming section 201. The image sort deciding section 203 decides whether inputted image information is a character image or a photograph image, and consists of a white width deciding section 210, a character frequency deciding section 211, a white background deciding section 212, and an image sort deciding section 213.

The white width deciding section 210 makes a temporary decision as to a sort of the document corresponding to a white width portion within an original document from a white peak position signal detected by the white peak position detector 208.

The character frequency deciding section 211 makes a decision as to the character frequency in an original document, from a density histogram formed by the histogram forming section 201, a white peak position signal detected by the white peak position detector 208, and a black peak position signal detected by the black peak position detector 209.

The white background deciding section 212 makes a temporary decision as to a sort of the document corresponding to a density histogram formed by the histogram forming section 201 and a white peak position signal detected by the white peak position detector 208.

The image sort deciding section 213 decides the sort of inputted image information (or the kind of an original document), from a combination of a decision result of the white width deciding section 210, a decision result of the character frequency deciding section 211, and a decision result of the white background deciding section 212.

The reference value calculating section 204 calculates reference values concerning white and black colors for making a gradation correction, on the basis of a density histogram formed by the histogram forming section 201 and a peak position detected by the peak position detecting section 202.

A reset deciding 205 makes a decision as to resetting on the basis of a halfway result of the character frequency deciding section 211 and a peak position detected by the peak position detecting section 202. If resetting is decided to be needed, the histogram forming section 201 is reset.

The reference value correcting section 206 corrects a reference value from the reference value calculating section 204 on the basis of a decision result of the image sort deciding section 203, and consists of a reference value selecting section 214, a reference change value control section 215, and an error decision control section 216.

The reference value selecting section 214 regards reference values calculated in the calculating section 204 or predetermined reference as white and black reference data, on the basis of an image sort decision result signal from the image sort deciding section 213. The reference change value control section 215 controls a change value of white and black reference values selected by the reference value selecting section 214. The error decision control section 216 restricts an error decision with respect to white and black reference values from the reference change value control section 215.

The range correcting section 207 makes a range correction with respect to inputted image information with use of white and black reference values corrected by the reference value correcting section 206.

In the next, an example of a specific circuit structure of each of the sections described above will be explained in brief. Note that the circuit configurations described below are only examples and the structures of respective sections are naturally not limited to the circuits described below.

Figure 5:
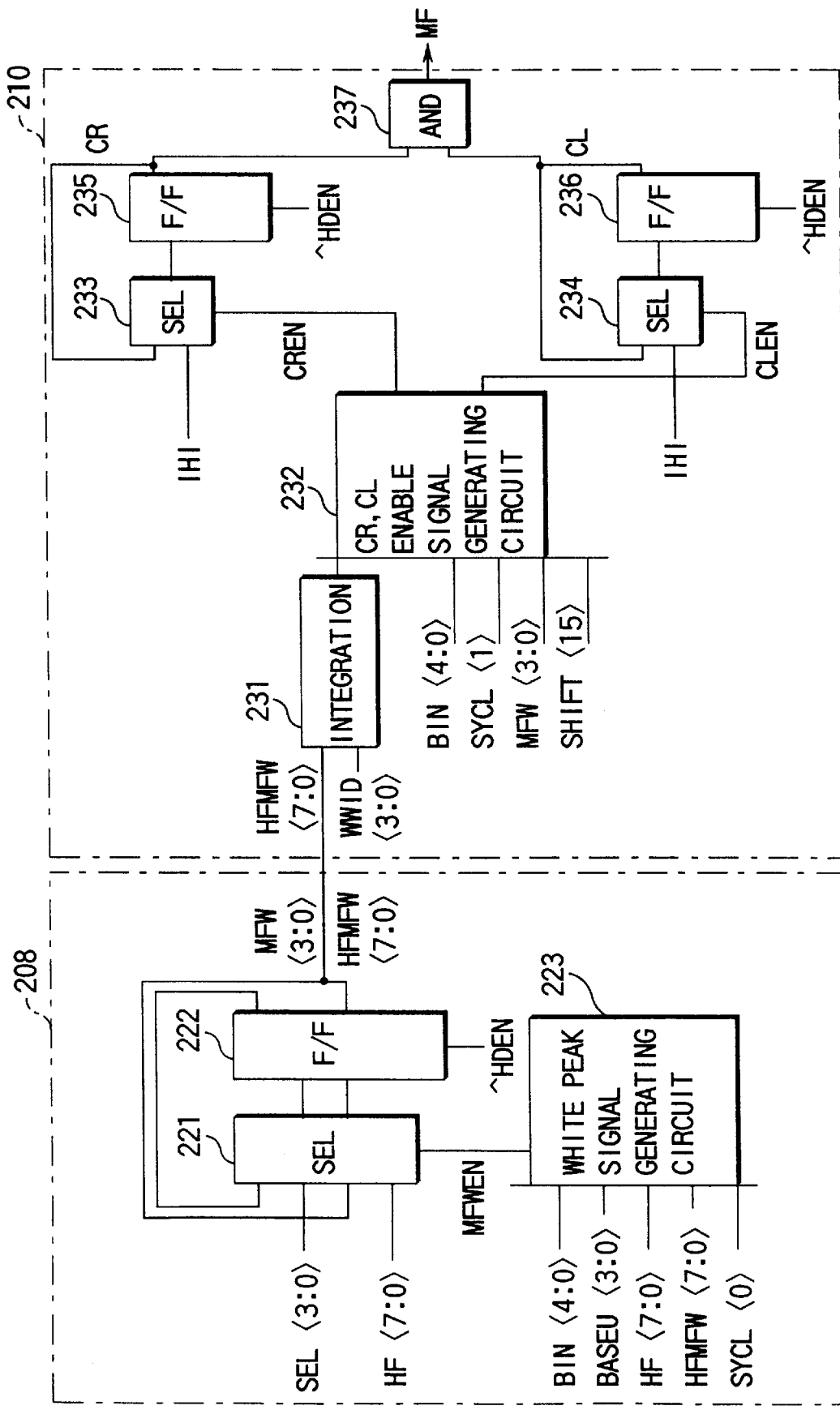
FIG. 5 is a circuit configuration showing practical examples of circuits constituting a white peak position detect section and a white width deciding section.

FIG. 5 shows an example of a specific circuit structure of a white peak position detector 208 and a white width deciding section 210. The white peak position detector 208 consists of an integration circuit 231, a CR/CL enable signal generating circuit 232, selectors 233 and 234, flip-flop circuits 235 and 236, and a AND circuit 237, and decides a white width portion from an inputted white peak position signal MFW and a histogram HF, thereby to output a decision result signal MFH.

Figure 6:
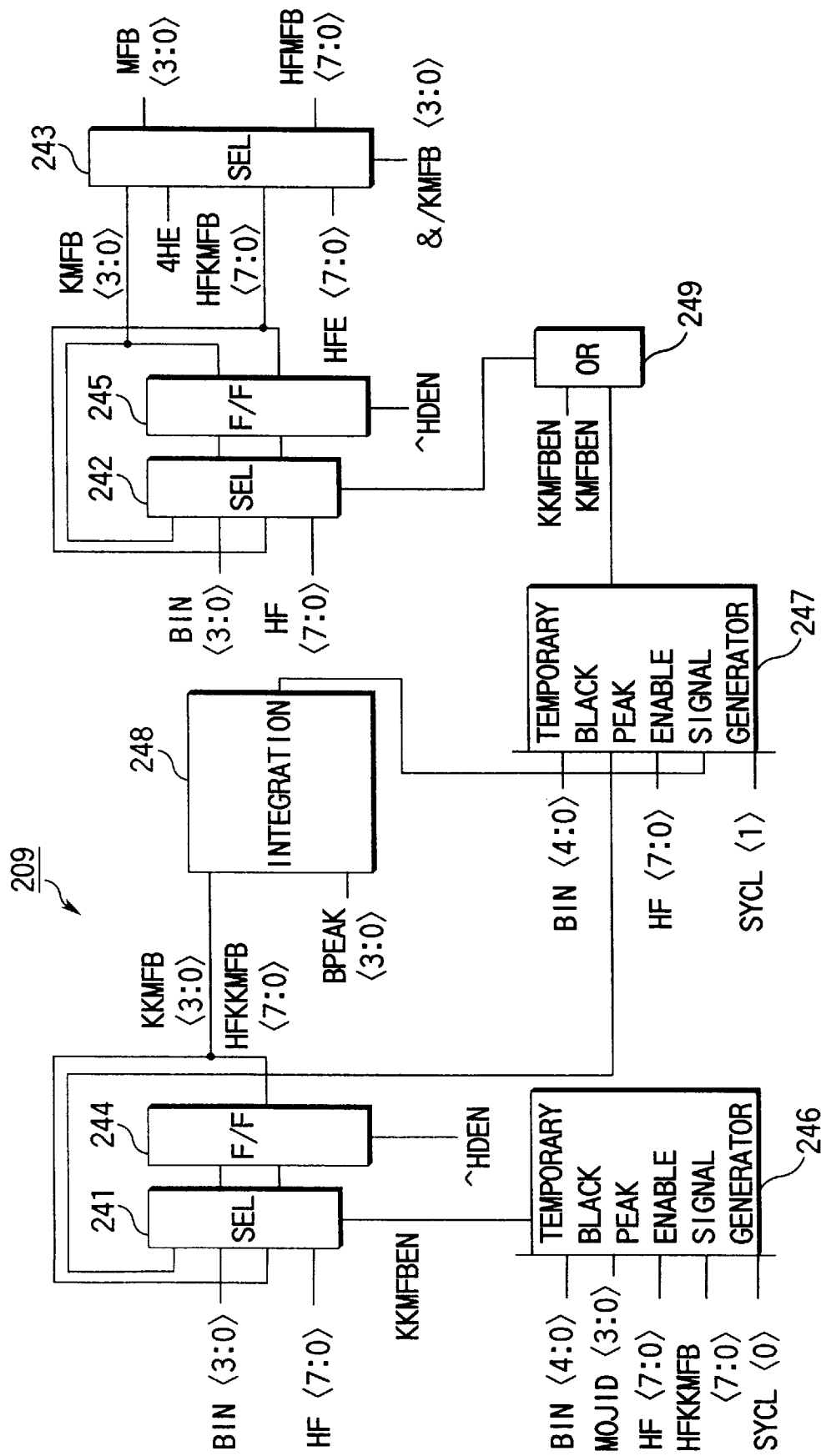
FIG. 6 is a circuit configuration showing a practical example of a circuit constituting a black peak position detector.

FIG. 6 shows a specific example of a circuit configuration of a black peak position detector 209. The black peak position detector 209 consists of selectors 241, 242, and 243, flip-flop circuits 244 and 245, temporary black peak enable signal generators 246 and 247, an integration circuit 248, and a OR circuit 249, and outputs a black peak position signal MFB from an inputted density histogram HF.

Figure 7:
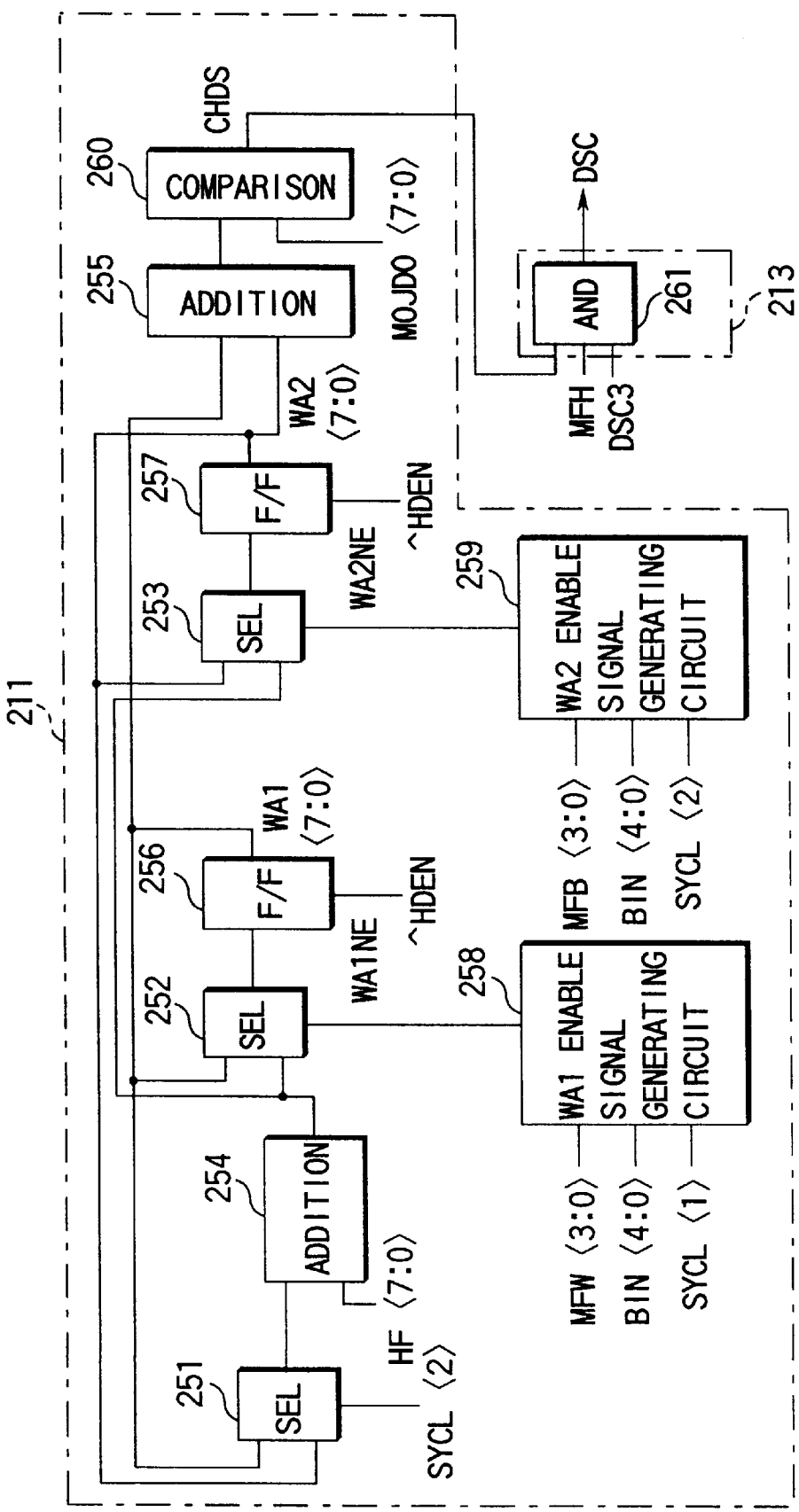
FIG. 7 is a circuit configuration showing practical examples of circuits constituting a character frequency deciding section and an original document sort deciding section.

FIG. 7 shows an example of a specific circuit configuration of the character frequency deciding section 211 and the image sort deciding section 213. The character frequency deciding section 211 consists of selectors 251, 252, and 253, addition circuits 254 and 255, flip-flop circuits 256 and 257, a WA1 enable signal generating circuit 258, a WA2 enable signal generating circuit 259, and a comparison circuit 260, and decides the character frequency from a white peak position signal MFW, a black peak position signal MFG, and a density histogram HF inputted, thereby to output a decision result signal CHDS.

The image sort deciding section 213 consists of a AND circuit 261 and outputs a decision result signal DSC concerning the image sort, from a character frequency decision result signal CHDS, a white width decision result signal MFH, and a white background decision result signal DSC3.

Figure 8:
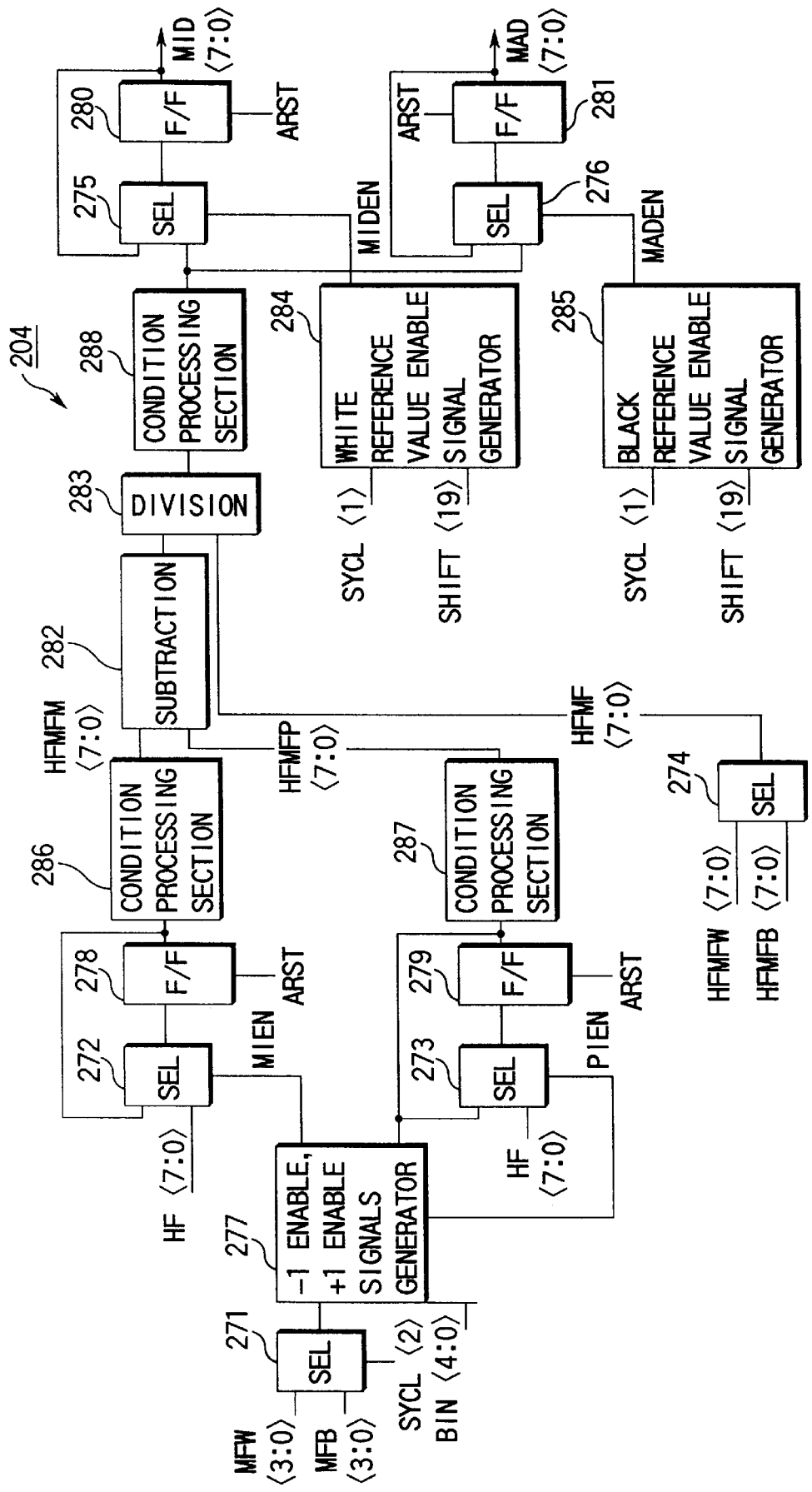
FIG. 8 is a circuit configuration showing a practical example of a reference value calculating section.

FIG. 8 shows a specific example of a circuit configuration of the reference value calculating section 204. The reference value calculating section 204 consists of selectors 271, 272, 273, 274, 275, and 276, −1 enable/−1 enable signal generator 277, flip-flop circuits 278, 279, 280, and 281, a subtraction circuit 282, a division circuit 283, a white reference value enable signal generator 284, a black reference value enable signal generator 285, and condition processing sections 286, 287, and 288. The reference value calculating section 204 calculates white and black reference values from a white peak position signal MFW, a black peak position signal MFB, and a density histogram HF inputted, and outputs a white reference value signal MID and a black reference signal MAD.

Figure 9:
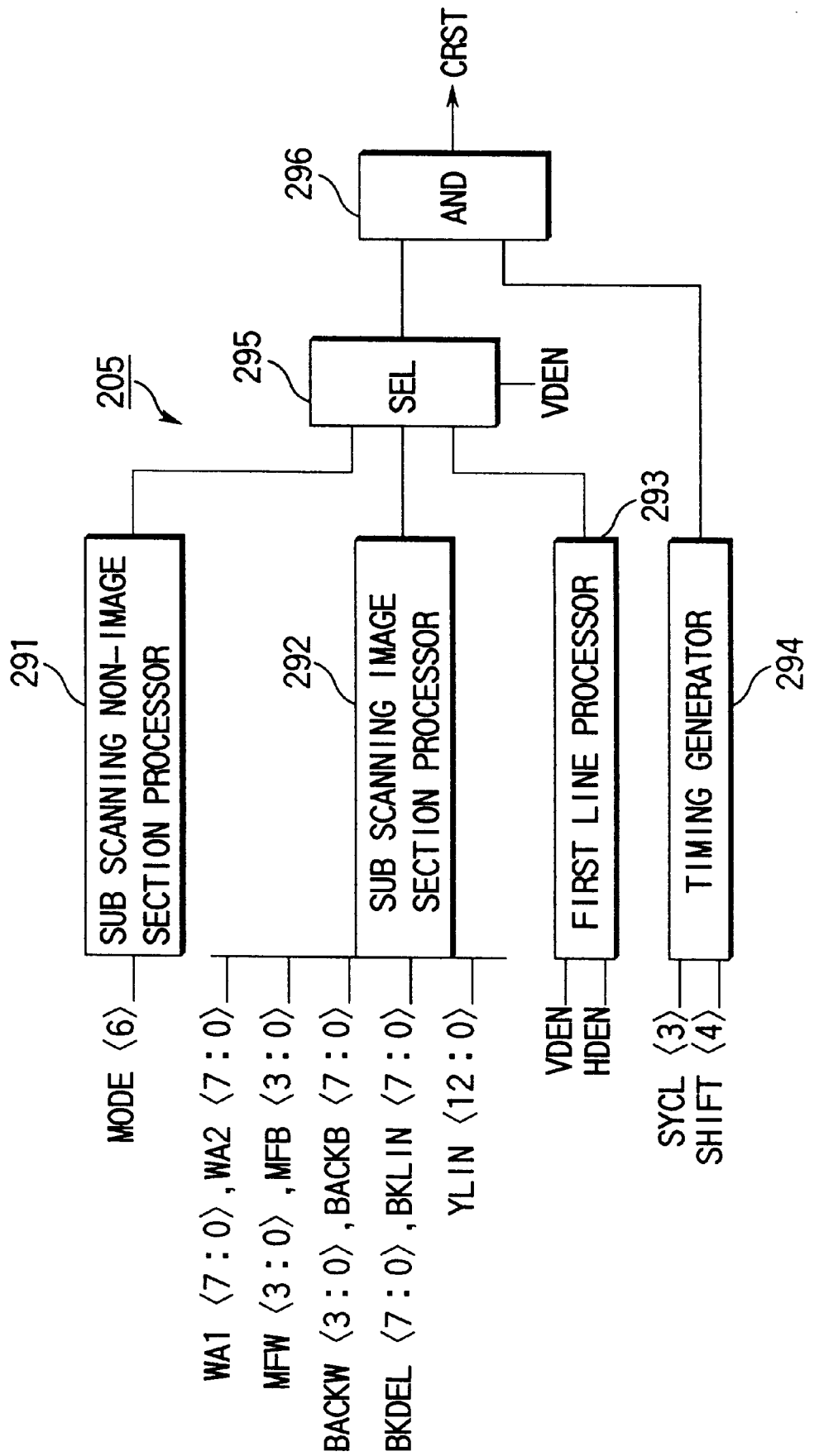
FIG. 9 is a circuit configuration showing a practical example of a reset deciding section.

FIG. 9 shows a specific example of a circuit configuration of a reset deciding section 205. The reset deciding section 205 consists of a sub-scanning non-image section processor 291, a sub-scanning image section processor 292, a first-line processor 293, a timing generator 294, a selector 295, and a AND circuit 296, and outputs a reset signal CRST to the histogram forming section 201 in correspondence with a vertical synchronous signal VDEN.

Figure 10:
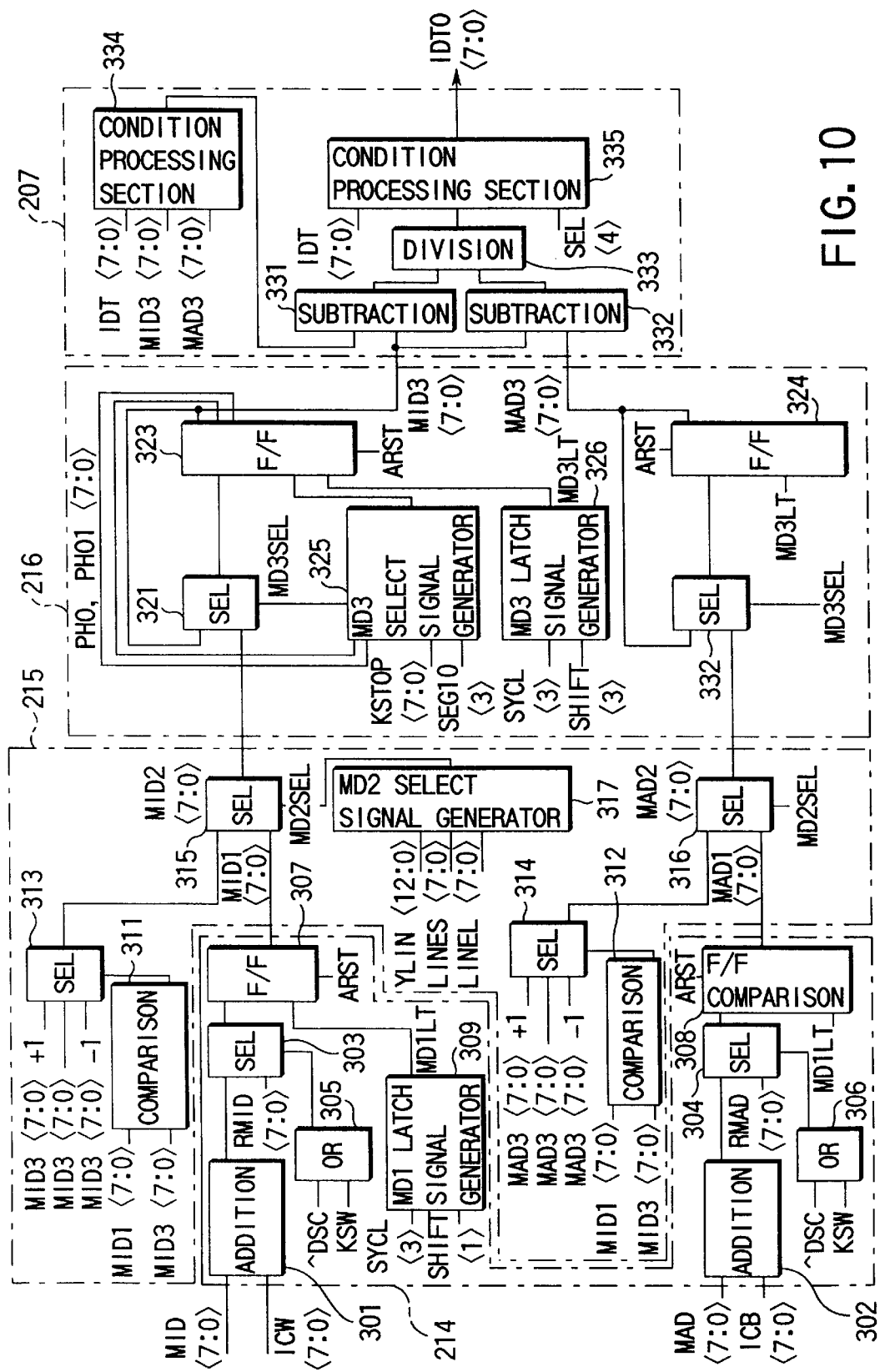
FIG. 10 is a circuit configuration showing practical examples of a reference value selecting section, a reference change value control section, an error-decision control section, and a range correcting section.

FIG. 10 shows a specific example of a circuit configuration of the reference value selecting section 214, the reference change value control section 215, the error decision control section 216, and the range correcting section 207. The reference value selecting section 214 consists of addition circuits 301 and 302, selectors 303 and 304, OR circuits 305 and 306, flip-flop circuits 307 and 308, and MD1 latch signal generator 309, and outputs a white reference value signal MID and a black reference value signal MAD from an image sort decision result signal DSC, a white reference value signal MID, and a black reference signal MAD.

The reference change value control section 215 consists of comparison circuits 311 and 312, selectors 313, 314, 315, and 316, and a MD select signal generator 317, and outputs a white reference value signal MID 2 and a black reference value signal MAD2 obtained by controlling the change values of a white reference value signal MID1 and a black reference value signal MAD1 inputted.

The error decision control section 216 consists of selectors 321 and 322, flip-flop circuits 323 and 324, a MD3 select signal generator 325, and a MD3 latch signal generator 326, and outputs a white reference value signal MID 3 and a black reference signal MAD3 obtained by restricting erroneous decisions of a white reference value signal MID2 and a black reference value signal MAD2 inputted.

The range correcting section 207 consists of subtraction circuits 331 and 332, a division circuit 333, and condition processing sections 334 and 335, and outputs image information IDT0 subjected to a range correction, from an inputted white reference value signal MID3, an inputted black reference value signal MAD3, and image information IDT delayed by one line by a line buffer not shown, supplied from the scanner section 4.

Figure 11:
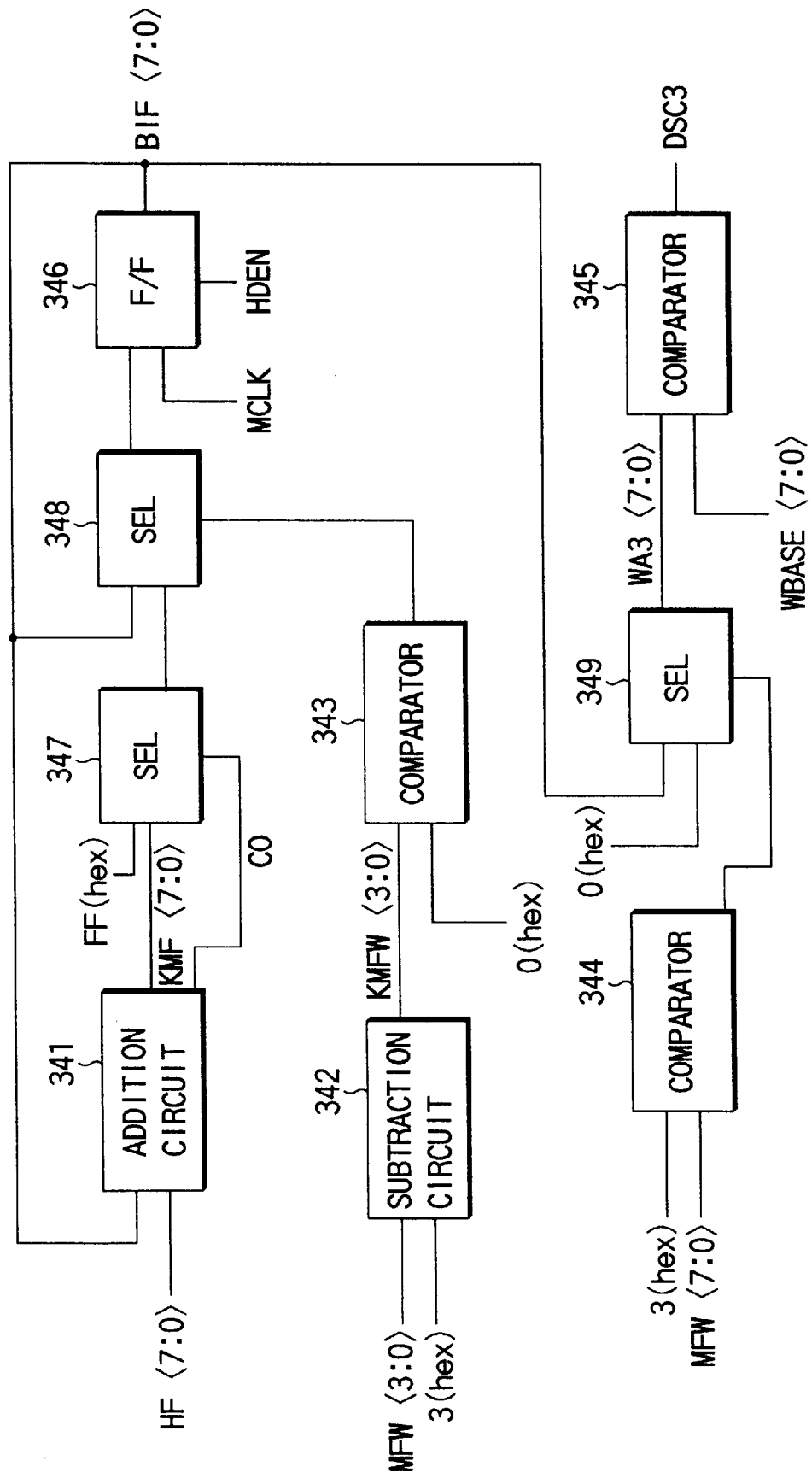
FIG. 11 is a circuit configuration showing a practical example of a circuit constituting a white background deciding section.

FIG. 11 shows a specific circuit configuration of a white background deciding section 212. The white background deciding section 212 consists of an addition circuit 341, a subtraction circuit 342, comparators 343, 344, and 345, a flip-flop circuit 346, and selectors 347, 348, and 349.

The addition circuit 341 adds a density histogram and an output BIF of the flip-flop circuit 346 together, and outputs a result KMF thereof. The selector 347 selects an addition result KMF or a constant FF (hex) by a carrier CO outputted from the adder circuit 341.

The subtraction circuit 342 subtracts a constant 3 (hex) from a white peak position signal MFW, and outputs a result KMFW thereof. The comparator 343 compares the subtraction result KMFW with a constant 0 (hex) and sends a result of the comparison to the selector 348. The output of the comparator 343 is a value representing the number of density histograms HF to be added.

The selector 348 switches either the output of the selector 347 or the output BIF of the flip-flop circuit 346 which should be outputted, by means of an output of the comparator 343. When the output value of the comparator 343 is reached, the selector 348 always selects the value of the output BIF of the flip-flop circuit 346 without selecting the output value of the selector 347. The output of the selector 348 is maintained by the flip-flop circuit 346.

The comparator 344 compares a white peak position signal MFW with a constant 3 (hex), and sends a result thereof to the selector 349. The selector 349 switches either the output BIF of the flip-flop circuit 346 or the constant 0 (hex) which should be outputted, by means of an output of the comparator 344. The output WA3 of the selector 349 is the histogram frequency in the side much whiter than a white peak position. The output WA3 is compared with a WBASE by the comparator 345, and a white background decision result DSC3 is outputted.

Here, the WBASE described above is a value obtained from a white position signal MFW, a density histogram density HF[MFW] at this time, and a threshold value previously given.

Figure 12:
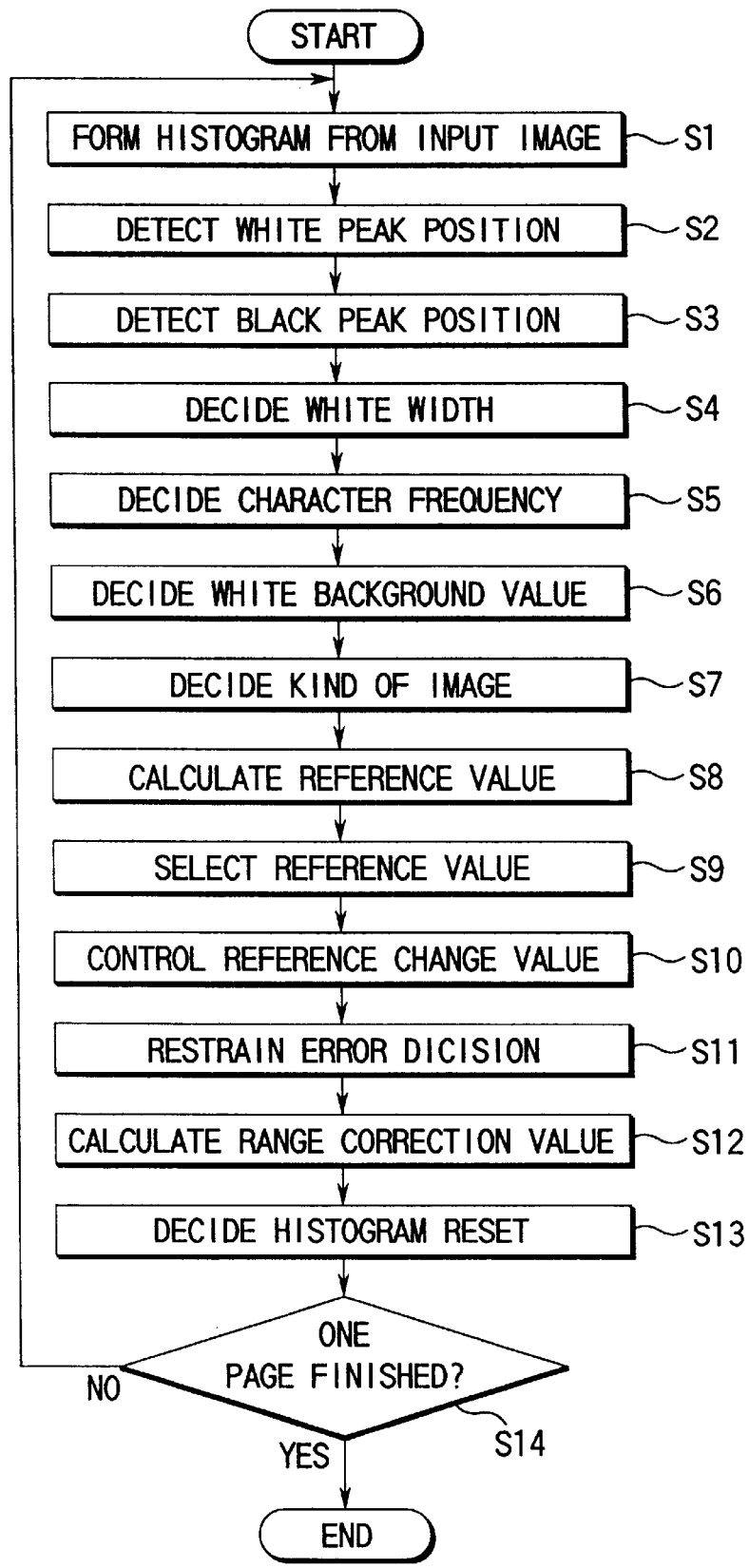
FIG. 12 is a flowchart explaining processing operation of the range correcting section.

Next, operation of the range correcting circuit 961 constructed in the structure as described above will be explained below with reference to a flowchart shown in FIG. 12. Note that the following explanation will be made supposing that image information is of the multi-value level of 8-bit.

Figure 13:
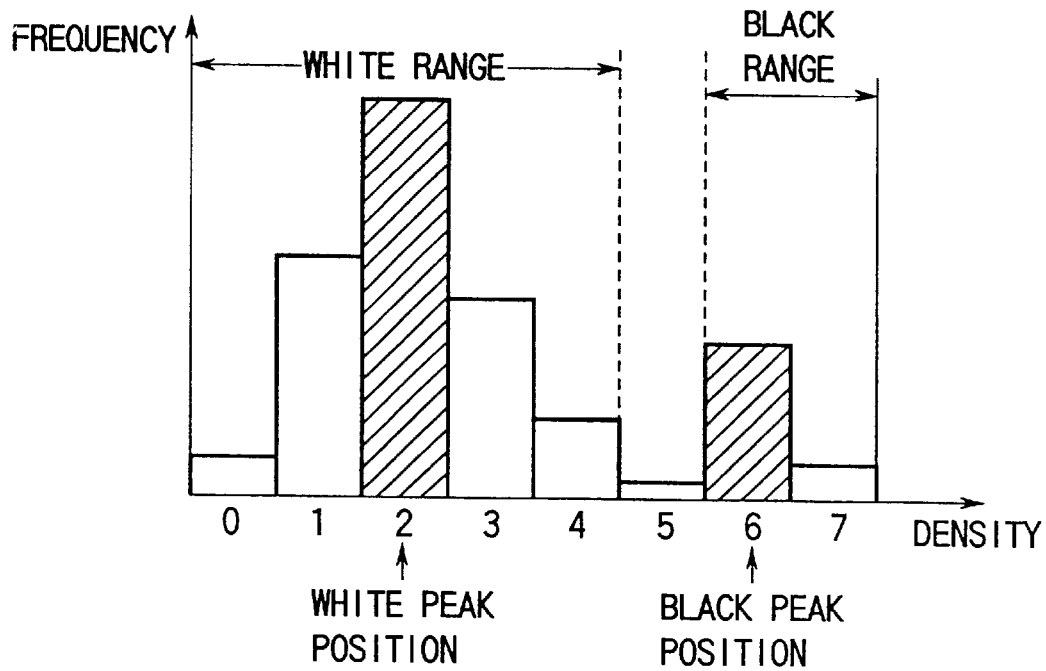
FIG. 13 is a graph of a density histogram formed where the multi-value of input image information is set to "8".

Firstly, in a step S1, the histogram forming section 201 receives digital image information read out from an original document D by the scanner section 4 and digitized into multi-value 8-bit data. From the image information, the histogram forming section 201 prepares a density histogram in which the lateral axis expresses a density and the longitudinal axis expresses an appearance frequency at the density, and outputs a density histogram signal. FIG. 13 shows an example of a density histogram where the multi-value of image information is set to "8".

Next, in steps S2 and S3, the peak position detecting section 202 detects two peak positions. For example, shapes of density histograms can roughly be divided into the following three cases.

(1) Including only one peak (2) Including two peaks (3) Including three or more peaks In addition to the above three cases, the following case exists.

(4) Including a plurality of crests each having a frequency which can be regarded as a peak.

How to decide a peak in these cases will be explained below.

Explained at first will be the case (1) which includes only one peak.

Figure 14:
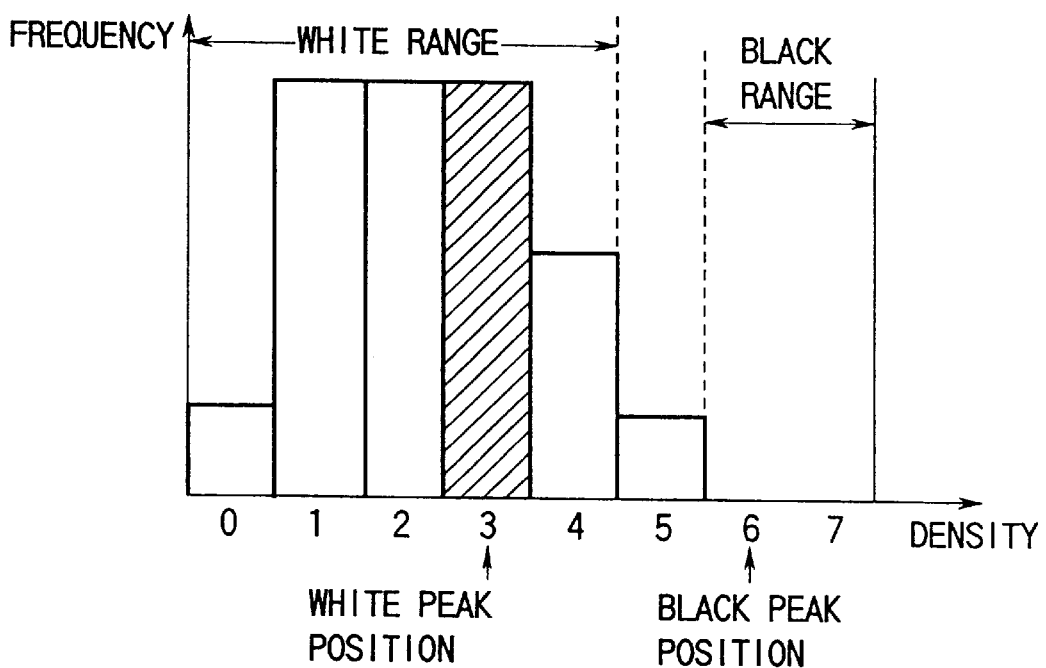
FIG. 14 is a graph of a density histogram formed where the multi-value of input image information is "8" and one peak exists.

FIG. 14 shows a density histogram where the multi-value is 8 and only one peak is included. Two peaks, i.e., one for the side of white and the other for the side of black should be decided, and therefore, a range from which a peak in the side of white is searched and another range from which a peak in the side of black is searched are previously determined. In FIG. 14, "0" to "4" are the white range while "5" to "8" are the black range.

In FIG. 14, a peak exists in the side of white. As for the side which includes a peak (e.g., the side of white in FIG. 14), a peak position is detected in the same manner as in the case of "including two peaks". As for the side which does not include a peak (e.g., the side of black in FIG. 14), a peak position is that which satisfies conditions previously given. An example of the conditions will be "the crest having the highest density", "the crest having the lowest density", "the crest in the middle of the scanning density range", or the like.

In this manner, one peak position can be decided for each of the sides of white and black, even if no peak is recognized, i.e., even if only a crest having a frequency "0" exists or crests have an equal frequency in the scanning density range. For example, in the density histogram shown in FIG. 14, if conditions are arranged such that "the crest should have the highest density among those crests which have the highest frequency" in the side of white and "the crest should have the lowest density" in the side of black, the white peak position is "3" and the black peak position is "6".

Next, explanation will be made of the case (2) including two peaks.

FIG. 13 shows a density histogram in case where the multi-value is 8 and two peaks are included. Two peaks, i.e., one in the side of white and the other in the side of black must be decided for, and therefore, a range from which a peak in the side of white should be searched and another range from which a peak in the side of black should be searched are previously given. In FIG. 13, it is supposed that "0" to "4" are the white range while "6" to "7" are the black range. Those that satisfy conditions previously given among these ranges are regarded as peak positions. Examples of the conditions will be "the one which has the n-th highest frequency within a scanning density range", "the crest adjacent in the right side to the crest having the highest frequency within a scanning density range", "the crest adjacent in the left side to the crest having the highest frequency in a scanning density range", "the crest having the frequency closest to n % of the frequency of the crest having the highest frequency in a scanning density range", and the like.

One or a combination of the above conditions is used to detect peak positions. Note that a case in which a plurality of crests have an equal frequency will be described later. Supposing that a condition that "the one which has the highest frequency in a scanning density range" is set for each of the sides of white and black in the density histogram shown in FIG. 13, the white peak position is "2" and the black peak position is "6".

Further, the case (3) of including three or more peaks will be explained below.

Figure 15:
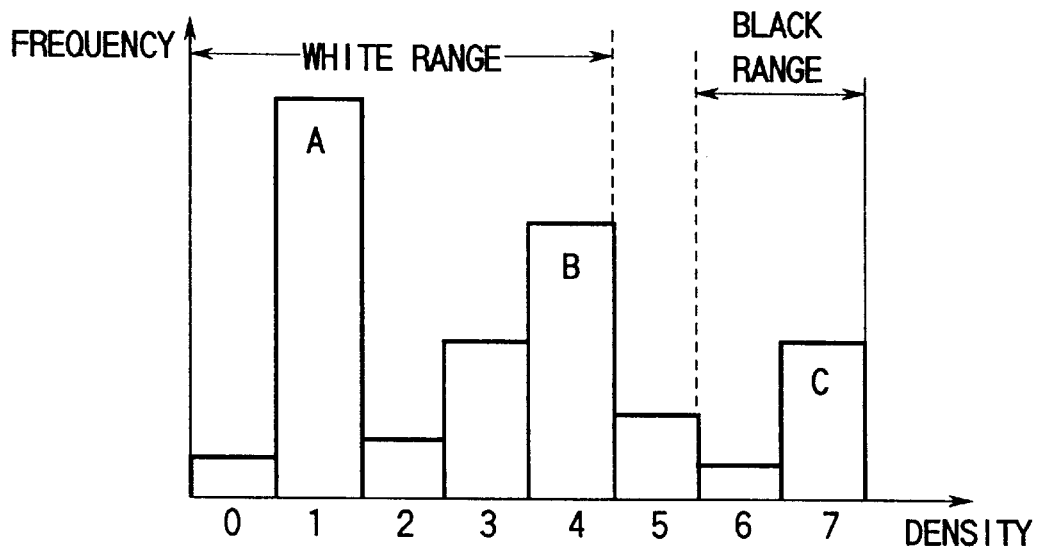
FIG. 15 is a graph of a density histogram formed where the multi-value of input image information is "8" and three peaks exist.

FIG. 15 shows a density histogram where the multi-value is 8 and three peaks are included. Two peaks, i.e., one in the side of white and the other in the side of black must be decided, and therefore, a range from which a peak in the side of white should be searched and another range from which a peak in the side of black should be searched are previously given. In FIG. 15, it is supposed that "0" to "4" are the white range while "6" to "7" are the side of black range and three crests which can be regarded as peak positions are denoted by A, B, and C in an order from the crest having the smallest density among them. When only one peak is included in a scanning density range (in the side of black in FIG. 15), the peak position is obtained in the same manner as in the case of including two peaks. If a plurality of peaks are included in a scanning density range, the one which satisfies conditions previously given is decided as the peak position. Examples of the conditions are "the crest having the n-th highest frequency", "the crest having the highest density", "the crest having the lowest density", "the crest having the highest frequency if the crest having the second highest frequency has a frequency of n % or less of the frequency of the crest having the highest frequency, and otherwise, the crest having a higher density", and the like.

One or a combination of the above conditions are used to detect a peak position. Note that a case of including a plurality of crests having an equal frequency will be explained later. In the histogram shown in FIG. 15, supposing that "the one having the highest frequency in a scanning density range" should be should be selected for both the sides of white and black, the white peak position is "1" at A and the black peak position is "7" at C.

Next, the case (4) including a plurality of crests which can be peak positions will be explained.

The one which satisfies conditions previously given is decided as the peak position if a plurality of crests have an equal frequency as shown in FIG. 14. Examples of the conditions are "the crest having the highest density among peak position candidates", "the crest having the lowest density among peak position candidates", "the crest having the middle density among peak position candidates", and the like.

Thus, white and black peak positions are detected.

Next, in a step S4, the white width deciding section 210 decides a white width portion of the original document D, from a density histogram prepared by the histogram forming section 201 and a white peak position signal detected by the white peak position detector 208. In this case, the original document D is decided as a character original document (MFH=1) if the white width portion is equal to or less than a predetermined threshold value while the original document is decided as a photograph original document (MFH=0) if the white width portion is equal to or greater than a predetermined threshold value.

Figure 17:
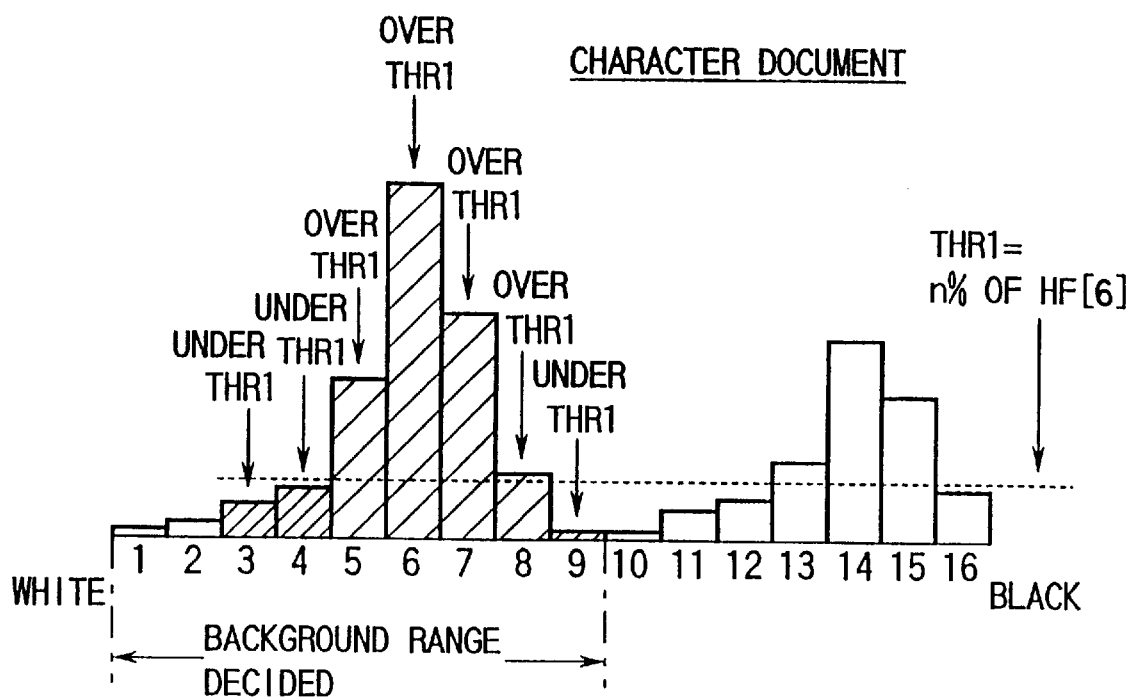
FIG. 17 is a graph showing an example of a density histogram concerning a character original document and explains processing of a white width deciding section.

Processing by the white width deciding section 210 will be explained in details below with reference to FIG. 17. In FIG. 17, the crest having the highest frequency within a range decided as a background portion is a crest of "6". Where the frequency of the crest "6" is HF[6] and n % of the frequency of the crest is the threshold value THR1, the following exists.

$$THR1 = HF[6] \times n \%$$

This value is compared with the frequencies of the left and right threshold values THR in the periphery of the crest "6" having the highest frequency. The crests to be compared with are six crests of "3, 4, 5, 7, 8, and 9" when THR2=3 exists.

The original document is decided as a character original document if there is at least one crest having a frequency smaller than the threshold value THR1 in each of the left and right sides among the above crests. Specifically, the original document is decided as a character original document where the following condition is satisfied.

| |
|---|
| THR1 > HF[3] or |
| THR1 > HF[4] or |
| THR1 > HF[5] |
| and |
| THR1 > HF[7] or |
| THR1 > HF[8] or |
| THR1 > HF[9] |

Figure 18:
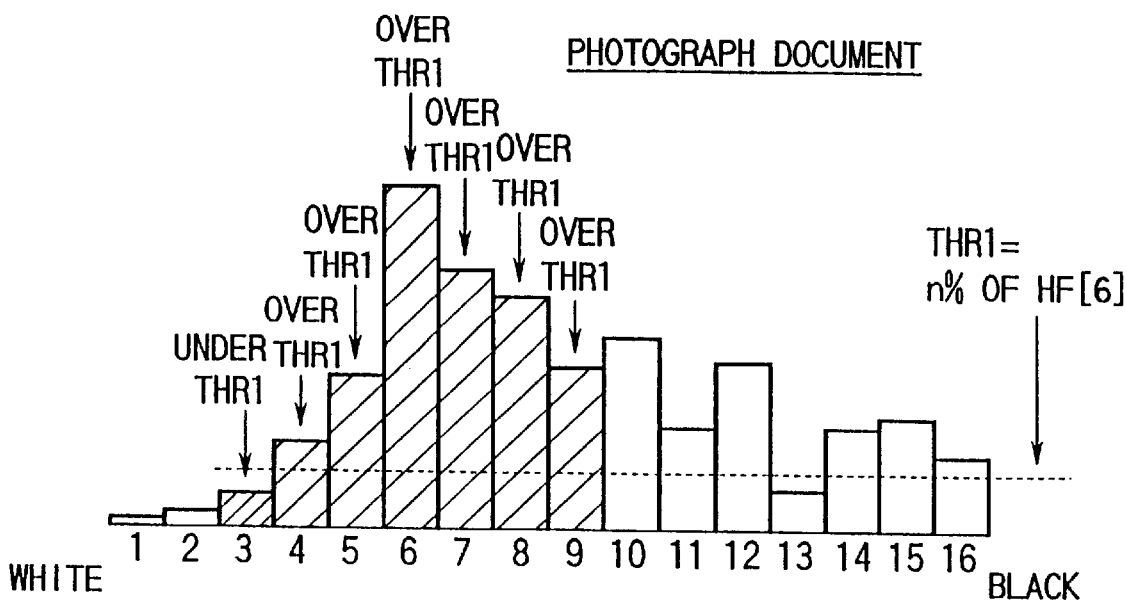
FIG. 18 is a graph showing an example of a density histogram concerning a photograph original document and explains processing of a white with deciding section.

An example of a density histogram in case where the original document is decided as a character original document is shown in FIG. 17. Where the above condition is not satisfied, the original document is decided as a photograph original document and a density histogram in such a case is shown in FIG. 18, for example.

Specifically, in case of a character original document, the peak of a background rises and falls within a narrow range, and therefore, there must be a sharp fall of the frequency among a few crests in the left and right sides of the crest having the highest frequency (in FIG. 17). In contrast, a photograph original document includes little background portions and includes many portions having intermediate frequencies, so that there is a high possibility that a few crests in the left and right sides of the crest having the highest frequency have frequencies substantially equal to or slightly smaller than the frequency of the crest having the highest frequency (as shown in FIG. 18). Thus, a character original document can be compared with a photograph original document by the condition described above.

Next, in a step S5, the character frequency deciding section 211 decides the character frequency within an original document D, from a density histogram prepared by the histogram forming section 201, a white peak position signal detected by the white peak position detector 208, and a black peak position signal detected by the black peak position detector 209. In this case, the original document D is decided as a character original document (CHDS=1) if the character frequency is equal to or greater than a predetermined threshold value while the original document D is decided as a photograph original document (CHDS=0) if the character frequency is equal to or smaller than a predetermined threshold value.

Figure 19:
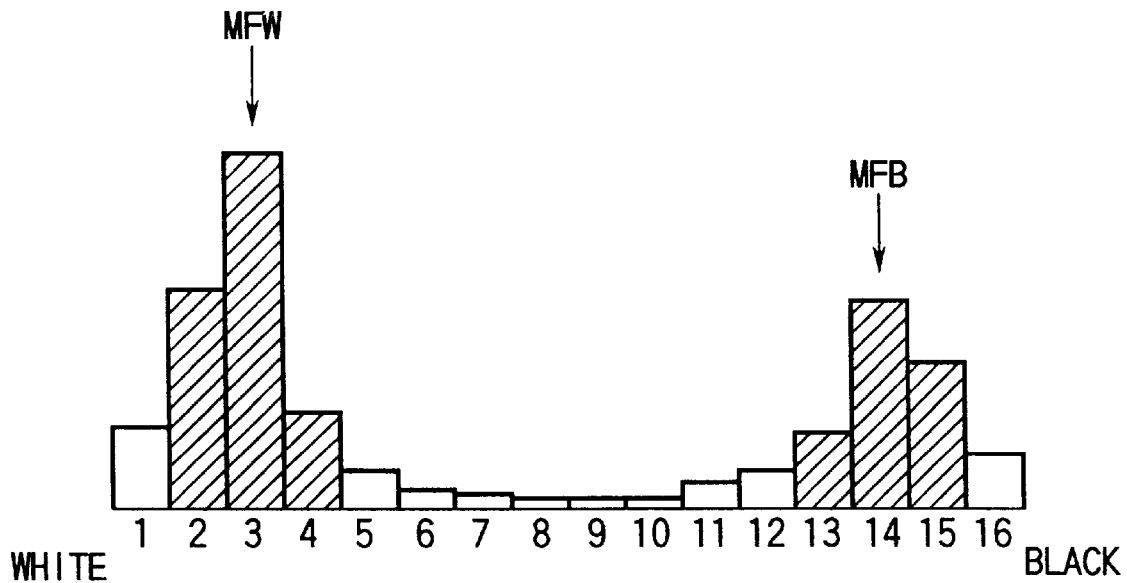
FIG. 19 is a graph showing an example of a density histogram and explains processing of a character frequency deciding section.

Processing by the character frequency deciding section 211 will be specifically explained with reference to an example of FIG. 19. A decision concerning a character frequency is carried out as follows, taking into consideration that the ratio of a background portion and a character portion to the entire portion is large when an original document is a character original document. Specifically, an output MFW of the white peak position detector 208 and an output MFB of the black peak position detector 209 are used to obtain a sum of frequencies of the back ground portion and the character portion, which is compared with m % of the total frequency.

Where the sum of frequencies of four crests of THRs in the left and right sides for each of the outputs MFW and MFB is WA, the followings are obtained in case of FIG. 19.

MFW=3

MFB=14

Where THR4=1 exists, the following exists.

WA=HF[2]+HF[3]+HF[4]+HF[13]+HF[14]+HF[15]

The sum WA of the frequencies obtained is compared with m % of the entire frequency T. If WA is greater than T, the sum of the background portions and character portions is greater and the original document is decided as a character original document.

$WA > T \times m$ % ... Character original document $WA \leq T \times m$ % ... Photograph original document Here, a decision is carried out with background portions added thereto because the occupation ratio of character portions is considerably low in case of a character original document and it is therefore difficult to make a decision with use of only the frequencies of character portions. However, since a photograph original document has intermediate densities, the ratio of background portions, if any, is smaller in comparison with an character original document, so that a character original document and a photograph original document can be distinguished from each other by providing an appropriate value of m %, if a decision is made in consideration of background portions.

Next, in a step S6, the white background deciding section 212 decides a white background amount within an original document, from a density histogram prepared by the histogram forming section 201 and a white peak position signal detected by the white peak position detector 208.

Figure 16:
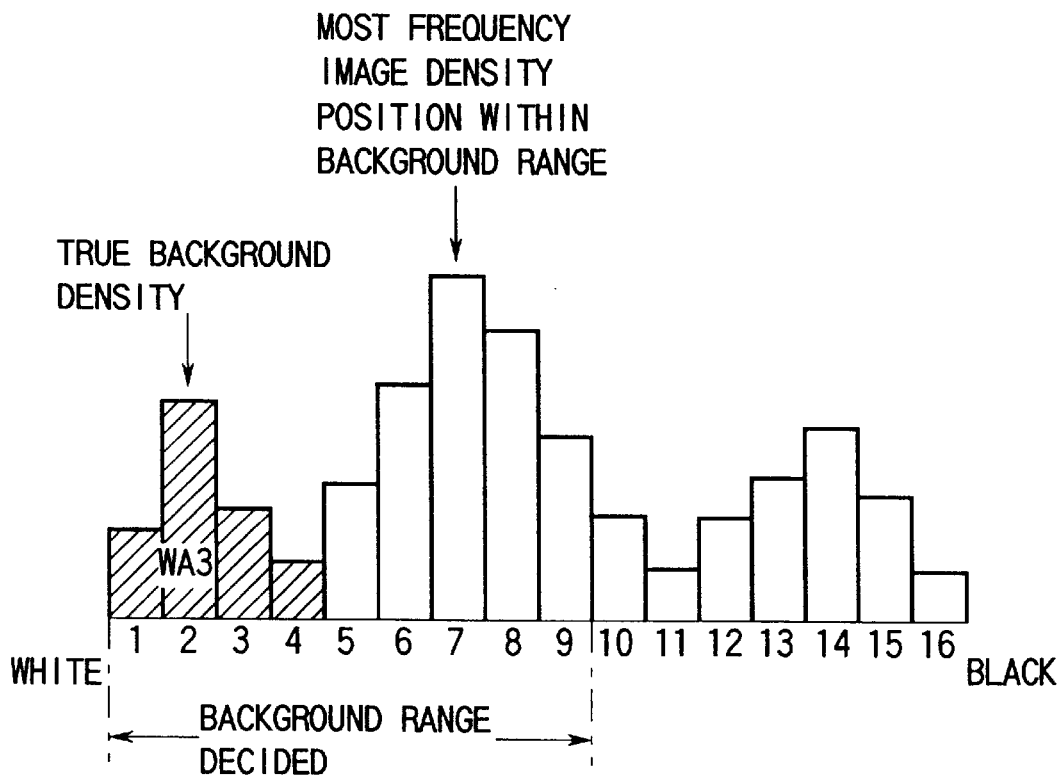
FIG. 16 is a graph showing an example of a density histogram formed when image information of an original document shown in FIG. 23 is inputted.
Figure 23:
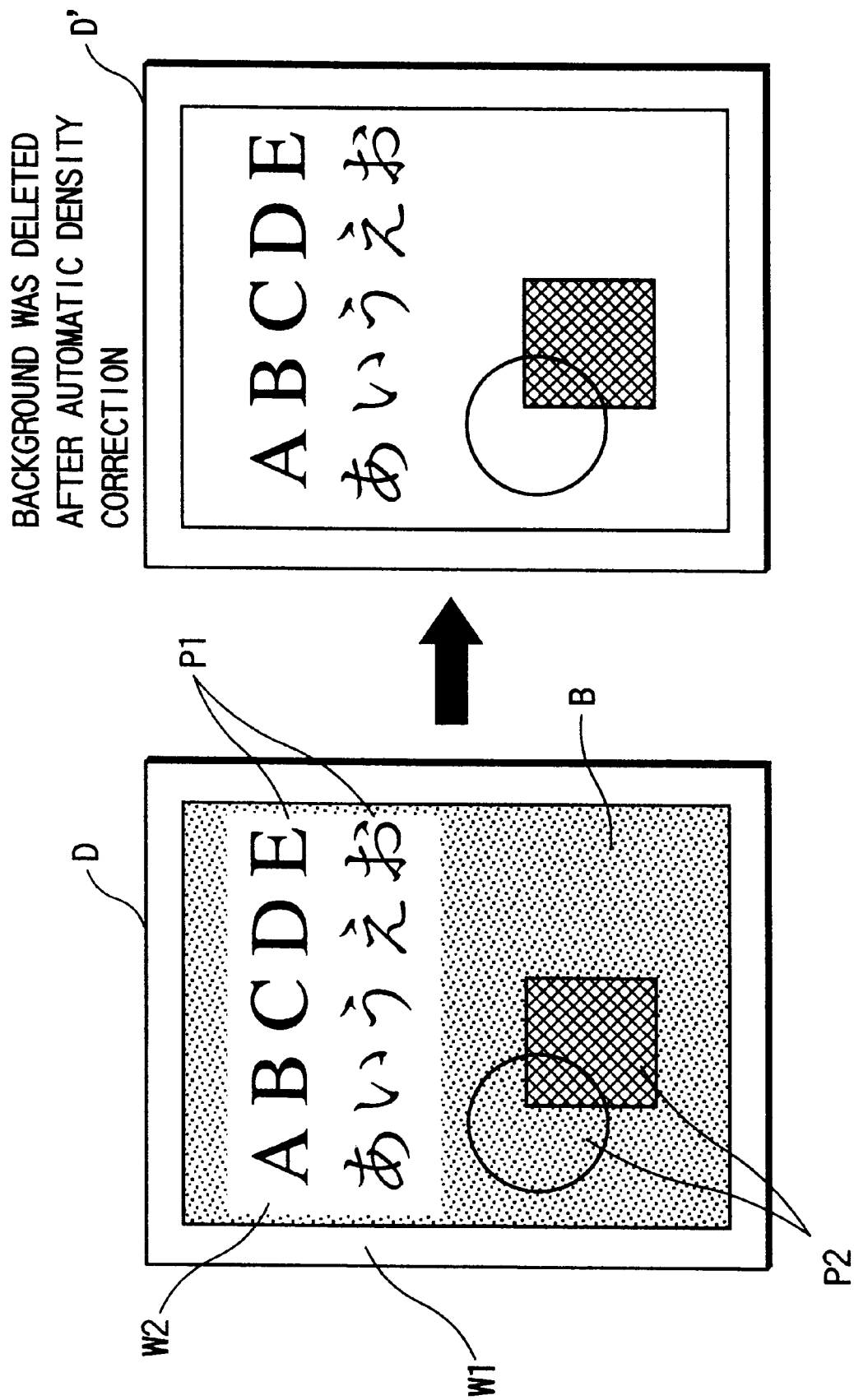
FIG. 23 is a view showing an example of an original document which easily causes an erroneous decision and an output image therefrom.

In the following, processing by the white background deciding section 212 will be explained in details. For example, where image information of an original document D as shown in FIG. 23, which will easily cause an erroneous decision, is inputted and a density histogram is prepared by the histogram forming section 201, the density histogram prepared will be as shown in FIG. 16. From this density histogram, a characteristic amount (or a background amount) is obtained for deciding the sort of an original document (or the type of image information).

Specifically, in FIG. 16, it is supposed that the portion "7" having the highest density within a density range decided as being equivalent to the density of a background portion is decided as a background density position. Next, in order to decide whether the density of the position "7" is a true background density, a sum WA3 of frequencies of those crests which are closer to the side of white than the position "7" (or which satisfy the following condition among crests of 1 to 6 in case of FIG. 16) is obtained and is compared with a threshold value. Here, the sum WA3 of the frequencies is obtained as follows where the position of the crest having the highest frequency in the background portion is MFW and the frequency of the crest having the n-th highest frequency is expressed as HF[n].

Where $MFW \leq$ Threshold value 1 or $MFW -$ Threshold value $2 \leq 0$, $WA3 = 0$ Where $MFW \geq$ Threshold value 1, $WA3 = HF[MFW - $ Threshold value $2] +$
$HF[MFW - ($Threshold value $2 + 1)] \ldots +$
$HF[2] + HF[1]$ The threshold value 1 is a background density position corresponding to white whose background should naturally be considered to be outputted in color of white. The threshold value is considered as a width from the center of a density distribution which should desirably be maintained, i.e., about an half of the peak width of a corresponding density, although it is removed in a conventional method. From FIG. 16, it should previously arranged so as to satisfy the threshold value 2=3 or so. Where the threshold value 2=3, the following is obtained in case of FIG. 16.

$$WA3=HF[4]+HF[3]+HF[2]+HF[1]$$

WA3 indicates how many frequencies exist in a portion whiter than the crest decided as a background. If the background portion thus decided is actually a background position, the value of WA3 is small. If a small peak exists in the side of white as shown in FIG. 16, the value of WA3 is large. Hence, the WA3 is compared with the threshold value 3 and a decision is made as follows.

Where WA3≦Threshold value 3, the original document is decided as a character original document (DSC3=1).

Where WA3>Threshold value 3, the original document is decided as a photograph original document (DSC3=0).

Next, in a step 7, the image sort deciding section 213 decides the sort of inputted image information (or the type of an original document), from a decision result of the white width deciding section 210, a decision result of the character frequency deciding section 211, and a decision result of the white background deciding section 212. Specifically, DSC=1 (meaning a character original document) is outputted if all the three inputs are "1", while DSC=0 (meaning a photograph original document) is outputted if any of three inputs is 0.

Next, in a step S8, the reference value calculating section 204 calculates a reference value, from a peak position signal detected by the peak position detecting section 202, as described before, and a density histogram signal prepared by the histogram preparation 201. Both of the white and black reference values are obtained by same calculation formulas.

Figure 20:
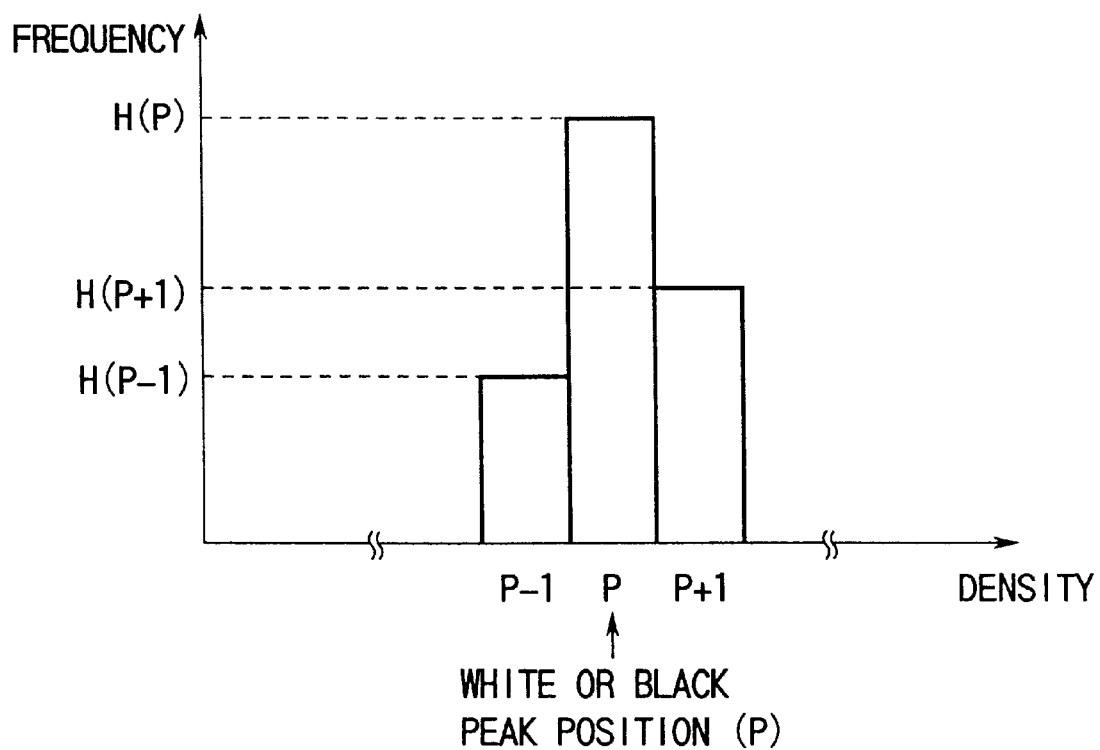
FIG. 20 is a graph showing a peak position and frequencies of left and right crests with respect to the peak position.

FIG. 20 shows a peak position of a density histogram and frequencies of crests in the left and right side of the peak position. Here, P denotes a peak position (or density), and P−1 and P+1 respectively denote frequencies of crests in the left and right side of the peak position P. H[P], H[P−1], H[P+1] are respectively frequencies of P, P−1, and P+1.

The reference values are obtained by the following formulas. If P−1 or P+1 does not exist, values of virtual crests are decided by a previously given condition as follows.

$$H[P-1]=0 \text{ or } H[P+1]=0$$

or $$H[P-1]=H[P] \text{ or } H[P+1]=H[P]$$

If H[P−1] or H[P+1] is greater than H[P], the condition is arranged as follows.

$$H[P-1]=H[P] \text{ or } H[P+1]=H[P]$$

A reference value K is obtained as follows.

$$K=[P\times(\text{Density width of a crest})+(\text{Density width of a crest})\times\frac{1}{2}](H[P+1]-H[P-1])/H[P]\times\{(\text{Density width of a crest})\times\frac{1}{2}\}$$

In the following, the white and black reference values are respectively denoted as Kw and Kb.

From calculations as described above, the reference value calculating section 204 calculates a reference value and outputs a reference value signal. The value of a reference value signal outputted from the reference value calculating section 204 is calculated for every period previously given. Therefore, a new reference value K(n) is decided for every period.

Next, in steps S9 to S11, the reference value correcting section 206 corrects a reference value signal from the reference value calculating section 204 because unevenness tends to easily appear in an output image after a gradation correction if a reference value once corrected by an offset constant changes for every predetermined period. In consideration of a case an erroneous decision has been made, the error decision control section 216 further corrects the reference value. The method of correcting the reference value will be explained in details below.

Firstly, the reference value selecting section 214 performs selection processing concerning reference values. Specifically, a reference value K is corrected with use of an image sort decision result signal from the image sort deciding section 203, a reference value signal from the reference value calculating section 204, a photograph image reference value constant previously given, a reference change value constant, and an offset constant. In the following, the correction method will be explained.

Firstly, the reference value K is changed with use of an offset constant.

$$K'=K+\text{Offset constant}$$

Further, K' is changed with use of a result of an image sort decision result signal outputted from the image sort deciding section 203.

Where an image sort decision result signal from the image sort deciding section 203 indicates a photograph original document, the following is obtained.

$$K(n)=\text{Photograph image constant}$$

Where an image sort decision result signal from the image sort deciding section 203 indicates a character original document, the following is obtained.

$$K(n)=K'$$

Figure 21:
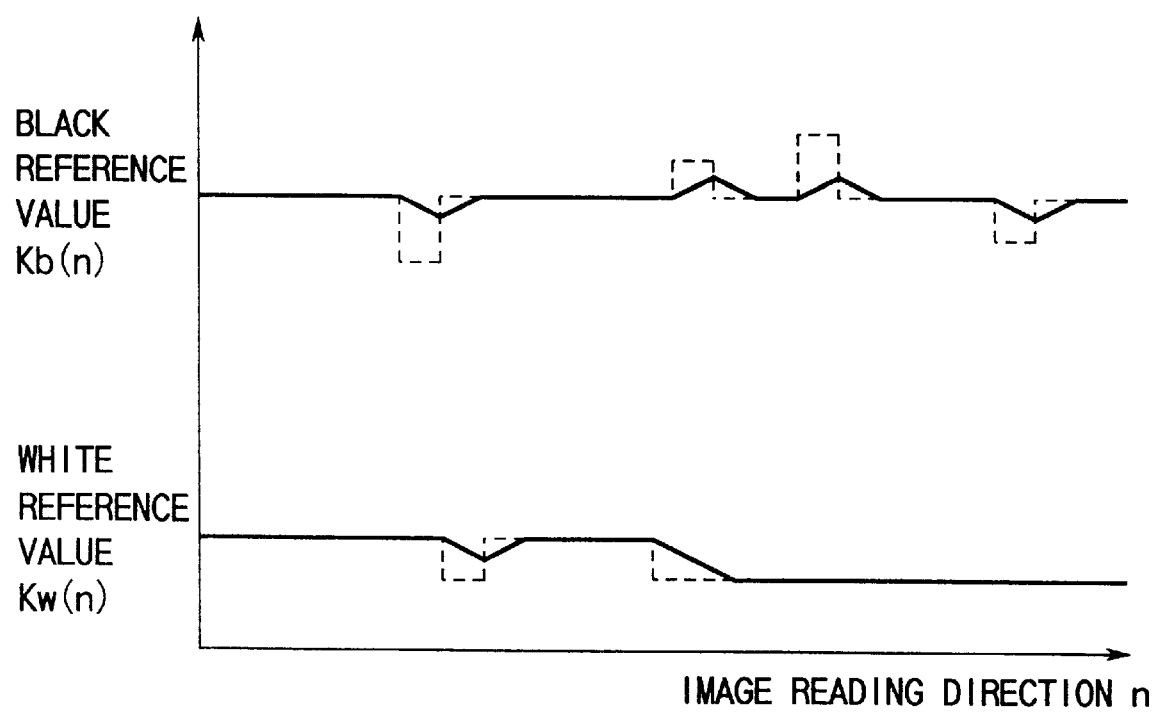
FIG. 21 is a graph for explaining a change of a reference value calculated for every predetermined period.

Subsequently, the reference change value control section 215 controls the change value of the reference value. FIG. 21 shows changes of the white reference value Kw(n) and the black reference value Kb(n) calculated for every predetermined period. A broken line indicates pre-correction changes and a continuous line indicates post-correction changes. Reference values should preferably change smoothly as indicated by the continuous line in FIG. 21, in order to restrict sharp density changes of an output image. Therefore, the reference change value control section 215 controls the characteristic of the broken line in FIG. 21 so as to match with the characteristic of the continuous line. In the following, the correction method will be explained.

Firstly, K(n−1) decided for a preceding cycle is compared with K(n).

Where K(n)<K(n−1)−Reference change value constant,
K'(n)=K(n−1)−Reference change value constant
Where K(n)>K(n−1)+Reference change value constant,
K'(n)=K(n−1)+Reference change value constant
Where K(n−1)−Reference change value constant
≦K(n)
≦K(n−1)+Reference change value constant,
K'(n)=K(n)

Subsequently, the error decision control section 216 performs restriction processing concerning an erroneous decision. Specifically, the section 216 counts how long a "character" or a "photograph" as a result of an image sort decision result signal from the image sort deciding section continues, thereby to further correct a reference value.

In other words, this processing prevents a decision result being erroneously recognized. For example, if an area decision concerning a photograph area is made after an area decision on an original document to be recognized was once made as deciding a character area, the corresponding area is immediately decided as a photograph area and correction processing is not performed. For example, in this processing, the reference value is corrected when an original document area is kept continuously decided as a photograph area for about 10 mm (which can be set to an appropriate value by setting).

Figure 22:
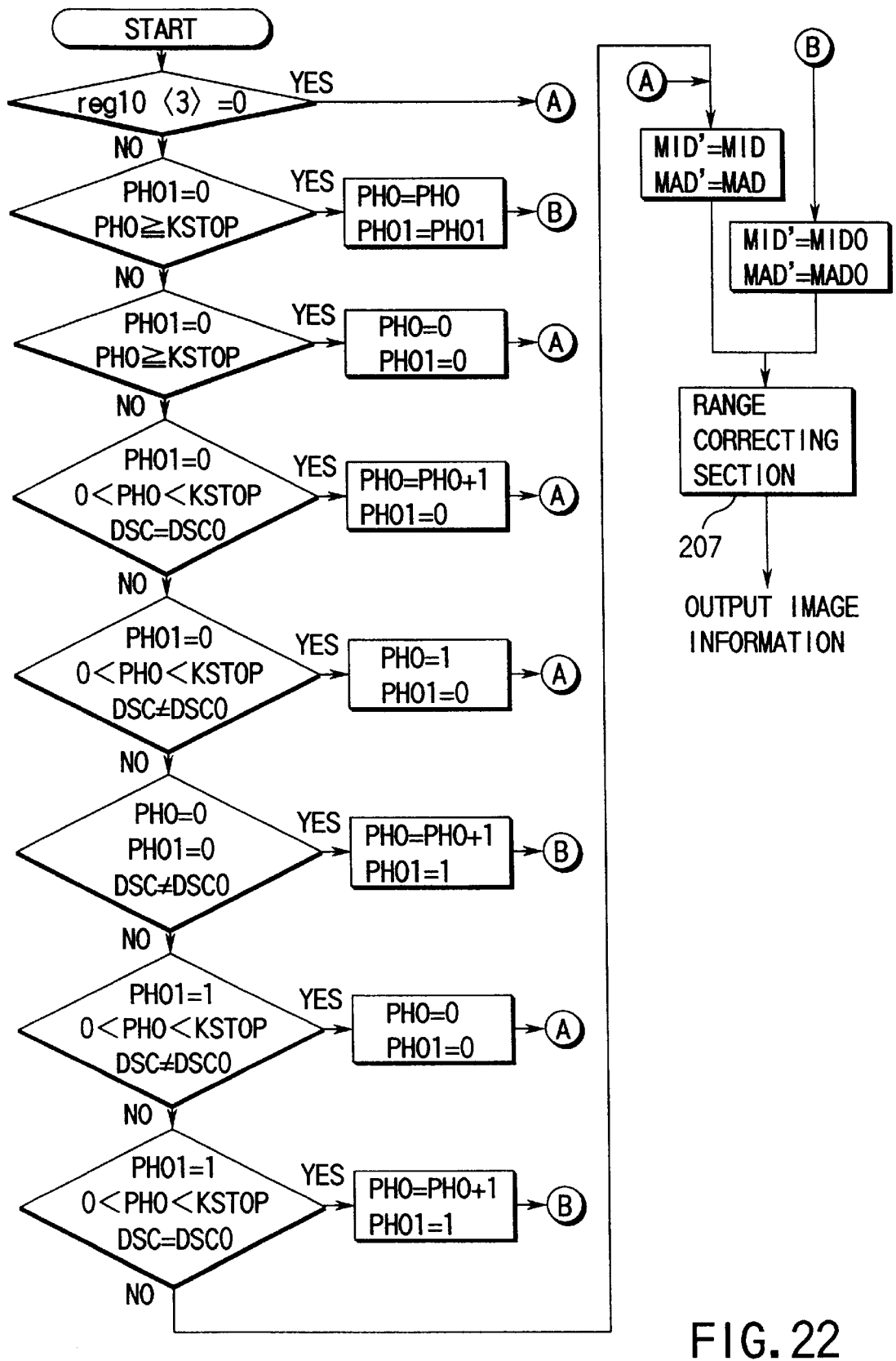
FIG. 22 is a flowchart for explaining correcting operation.

FIG. 22 is a flowchart showing the operation of the correction processing. Note that the operation of this correction processing will be explained with reference to the reference symbols cited below. The initial values are PHO=1, PHO1=0, and DSC0=1.

| | |
|---|---|
| DSC | : original decision result |
| DSC0 | : Previous original document decision result |
| PHO | : Decision result counter |
| PHO1 | : Decision result change flag |
| KSTOP | : Decision result counter threshold value |
| reg10[3] | : Reference value correction control register (No = 0/Yes = 1) |
| MID0 | : Previous white reference value |
| MAD0 | : Previous black reference value |
| MID | : White reference value before correction |
| MAD | : Black reference value after correction |
| MID' | : White reference value used for gradation correction |
| MAD' | : Black reference value used for gradation correction |

Where reg10[3]=1, priorities are given to the following eight processing steps in this order and any of them is carried out.

(1) Where (PHO≧KSTOP) and (PHO1=1):
MID'=MID0
MAD'=MAD0
PHO=PHO
PHO1=PHO1
(2) Where (PHO≧KSTOP) and (PHO1=0):
MID'=MID
MAD'=MAD
PHO=0
PHO1=0
(3) Where (0<PHO<KSTOP) and (PHO1=0) and (DSC=DSC0):
MID'=MID
MAD'=MAD
PHO=PHO+1
PHO1=0
(4) Where (0<PHO<KSTOP) and (PHO1=0) and (DSC≠DSC0):
MID'=MID
MAD'=MAD
PHO=1
PHO1=0
(5) Where (PHO=0) and (PHO1=0) and (DSC≠DSC0):
MID'=MID0
MAD'=MAD0
PHO=PHO+1
PHO1=1
(6) Where (0<PHO<KSTOP) and (PHO1=1) and (DSC≠DSC0):
MID'=MID
MAD'=MAD
PHO=0
PHO1=0
(7) Where (1<PHO<KSTOP) and (PHO1=1) and (DSC=DSC0):
MID'=MID0
MAD'=MAD0
PHO=PHO+1
PHO1=1
(8) Where none the conditions of (1) to (7) is satisfied:
MID'=MID
MAD'=MAD
PHO=PHO
PHO1=PHO1
and where reg10[3]=0
MID'=MID
MAD'=MAD The reference value correcting section 206 outputs a reference value thus corrected, as a reference value signal after correction.

Next, in a step S10, the range correcting section 207 performs a gradation correction on image information with use of a reference value signal after correction, as an output from the reference value correcting section 206. In this case, the range correcting section 207 makes a linear correction on a width of 0 to FF (hex), from the white reference value Kw(n) and the black reference value Kb(n) obtained, in case where the multi-value level is 8-bit. Specifically, the range correcting section 207 subjects image information to a gradation correction in accordance with the following formula and outputs output image information.

$$D'=(D-Kw(n))/(Kb(n)-Kw(n))\times FF(hex)$$

Thus, reference values are calculated from a density histogram for every predetermined period and a gradation correction is performed with use of the values.

Next, in a step S11, the reset deciding section 205 makes a reset decision on the basis of a decision result from the character frequency deciding section 211 and a peak position detected by the peak position detecting section 202. If it is decided that resetting is needed, the histogram forming section 201 is reset.

Next, in a step S12, whether or not processing for one page is completed is decided. If not, the flow returns to the step Sl and the processing as described above is repeated. If completed, the operation is terminated.

As has been specifically described above, according to the present invention, a density histogram is prepared from inputted image information and the sort of the inputted image information is decided from a distribution of background portions of an original document and an image density value having the greatest frequency within the range of the background portions, in the density histogram. In accordance with the decision result, the gradation of the inputted image information is corrected. It this manner, it is possible to provide an image processing method and an image processing apparatus which are capable of deciding the sort of inputted image information with a high precision and automatically correcting the gradation of the inputted image information on real time.

Further, according to the present invention, a density histogram is prepared from inputted image information, and the sort of the inputted image information is decided from characteristics of the density histogram prepared. The sort of the inputted image information is also decided from a distribution of background portions of an original document and an image density value having the greatest frequency within the range of the background portions in the density histogram prepared. By combining both of the decision results, the sort of the inputted image information is finally decided, and the gradation of the inputted image information is corrected in accordance with the final decision result. In this manner, it is therefore possible to provide an image processing method and an image processing apparatus which are capable of deciding the sort of inputted image information with a high precision and automatically correcting the gradation of the inputted image information on real time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An image processing apparatus comprising:
   means for fetching an image;
   means for forming a density histogram based on the fetched image;
   means for deciding a sort of the fetched image corresponding to a histogram distribution of a background area when the density histogram is divided into the background area and a character area having an image density higher than the background area, a first image density frequency having a maximum frequency within a range of the background area, and each frequency of the density histogram in left and right sides of a crest having the first image density frequency; and
   means for correcting a gradation of the fetched image, in accordance with a decision result of the deciding means.

2. An image processing apparatus according to claim 1, wherein the deciding means includes deciding means for deciding the fetched image as a character image when at least one crest of a histogram having a frequency of a predetermined percentage or less of the first image density frequency of the background area exists in predetermined range of each of left and right sides of a crest having the first image density frequency, and for deciding the fetched image as a photograph image when not.

3. An image processing apparatus according to claim 1, wherein the deciding means includes:
   means for obtaining the first image density frequency having a maximum frequency within a range of the background area, and the second image density frequency having a maximum frequency within a range of the character area; and
   means for deciding the fetched image as a character area when a total of a subtotal of frequencies of a predetermined number of image densities in left and right sides of a first crest having the first image density frequency and a subtotal of frequencies of a predetermined number of image densities in left and right sides of a crest having the second image density frequency is greater than a predetermined percentage of a frequency total of frequencies of the entire density histogram; and
   means for deciding the fetched image as a photograph area when the total is equal to or smaller than the predetermined percentage of the frequency total of the entire density histogram.

4. An image processing apparatus according to claim 1, wherein the deciding means includes:
   means for calculating an accumulative frequency by summing frequencies of a histogram crest having a density lower by a predetermined second density value than a first image density value of the first image density frequency to a histogram crest having a minimum density value when the first image density value of the first image density frequency is greater than a predetermined first density value; and
   means for deciding the fetched image as a photograph image when the accumulative frequency is greater than a predetermined frequency, and for deciding the fetched image as a character image when the accumulative frequency is equal to or smaller than the predetermine frequency.

5. An image processing apparatus according to claim 1, wherein the deciding means includes:
   first deciding means for deciding the fetched image as a character image when at least one crest of a histogram having a frequency of a predetermined percentage or less of a first crest having the first image density frequency of the background area exists in each of left and right sides of the first image density frequency, and for deciding the fetched image as a photograph image when not;
   means for obtaining the first image density frequency having a maximum frequency within a range of the background area, and a second image density frequency having a maximum frequency within a range of the character area;
   second deciding means for deciding the fetched image as a character area when a total of a subtotal of frequencies of a predetermined number of image densities in left and right sides of the first crest and a subtotal of frequencies of a predetermined number of image densities in left and right sides of a second crest having the second image density frequency is greater than a predetermined second percentage of a frequency total of frequencies of the entire density histogram, and for deciding the fetched image as a photograph area when the total is equal to or smaller than the predetermined second percentage of the frequency total of the entire density histogram;
   means for calculating an accumulative frequency by summing frequencies of a histogram crest having a density lower by a predetermined second density value than a first density value having the first image density frequency to a histogram crest having a minimum density value when the first image density value is greater than a predetermined first density value; and
   third deciding means for deciding the fetched image as a photograph image when the accumulative frequency is greater than a predetermined frequency, and for deciding the fetched image as a character image when the accumulative frequency is equal to or smaller than the predetermine frequency;
   fourth deciding means for deciding the fetched image as a photograph image when any one of the first, second, and third deciding means decides the fetched image as a photograph image; and means for correcting a gradation of the fetched image accordance with a decision result of the fourth deciding means.

6. An image processing apparatus according to claim 1, wherein the correcting means includes means for correcting a gradation of the fetched image, in correspondence with a second image sort different from a first image sort, after recognizing that a predetermined number of decisions of the second image sort are made continuously after the deciding means makes a decision of the first image sort.

7. An image processing method comprising:
   a step of fetching an image;
   a step of forming a density histogram based on the fetched image;
   a step of deciding a sort of the fetched image corresponding to a histogram distribution of a background area when the density histogram is divided into the background area and a character area having an image density higher than the background area, a first image density frequency having a maximum frequency within a range of the background area, and each frequency of the density histogram in left and right sides of a crest having the first image density frequency; and
   a step of correcting a gradation of the fetched image, in accordance with a decision result of the deciding step.

8. An image processing method according to claim 7, wherein the deciding step includes a deciding step of deciding the fetched image as a character image when at least one crest of a histogram having a frequency of a predetermined percentage or less of the first image density frequency of the background area exists in predetermined range of each of left and right sides of a crest having the first image density frequency, and of deciding the fetched image as a photograph image when not.

9. An image processing method according to claim 7, wherein the deciding step includes:
   a step of obtaining the first image density frequency having a maximum frequency within a range of the background area, and the second image density frequency having a maximum frequency within a range of the character area; and
   a step of deciding the fetched image as a character area when a total of a subtotal of frequencies of a predetermined number of image densities in left and right sides of a first crest having the first image density frequency and a subtotal of frequencies of a predetermined number of image densities in left and right sides of a second crest having the second image density frequency is greater than a predetermined percentage of a frequency total of frequencies of the entire density histogram; and
   a step of deciding the fetched image as a photograph area when the total is equal to or smaller than the predetermined percentage of the frequency total of the entire density histogram.

10. An image processing method according to claim 7, wherein the deciding step includes:
    a step of calculating an accumulative frequency by summing frequencies of a histogram crest having a density lower by a predetermined second density value than a first image density value having the first image density frequency to a histogram crest having a minimum density value when the first image density value is greater than a predetermined first density value; and
    a step of deciding the fetched image as a photograph image when the accumulative frequency is greater than a predetermined frequency, and for deciding the fetched image as a character image when the accumulative frequency is equal to or smaller than the predetermine frequency.

11. An image processing method according to claim 7, wherein the deciding step includes:
    a first deciding step of deciding the fetched image as a character image when at least one crest of a histogram having a frequency of a predetermined percentage or less of the first image density frequency of the background area exists in each of left and right sides of a first crest having the first image density frequency, and of deciding the fetched image as a photograph image when not;
    a step of obtaining the first image density frequency having a maximum frequency within a range of the background area, and a second image density frequency having a maximum frequency within a range of the character area;
    a second deciding step of deciding the fetched image as a character area when a total of a subtotal of frequencies of a predetermined number of image densities in left and right sides of the first crest and a subtotal of frequencies of a predetermined number of image densities in left and right sides of a second crest having the second image density frequency is greater than a predetermined second percentage of a frequency total of frequencies of the entire density histogram, and of deciding the fetched image as a photograph area when the total is equal to or smaller than the predetermined second percentage of the frequency total of the entire density histogram;
    a step of calculating an accumulative frequency by summing frequencies of a histogram crest having a density lower by a predetermined second density value than a density value of a first image density value having the first image density frequency to a histogram crest having a minimum density value when the first image density frequency is greater than a predetermined first density value; and
    a third deciding step of deciding the fetched image as a photograph image when the accumulative frequency is greater than a predetermined frequency, and for deciding the fetched image as a character image when the accumulative frequency is equal to or smaller than the predetermine frequency;
    a fourth deciding step for deciding the fetched image as a photograph image when any of the first, second, and third deciding steps decides the fetched image as a photograph image; and
    a step of correcting a gradation of the fetched image accordance with a decision result of the fourth deciding means.

12. An image processing method according to claim 7, wherein the correcting step includes a step for correcting a gradation of the fetched image, in correspondence with a second image sort different from a first image sort, after recognizing that a predetermined number of decisions of the second image sort are made continuously after the deciding step makes a decision of the first image sort.

13. An image processing apparatus comprising:
    means for fetching an image;
    means for forming a density histogram based on the fetched image;
    means for detecting a background area and a character area corresponding to the density histogram formed by the forming means;

means for deciding a sort of the fetched image corresponding to a first image density frequency having a maximum frequency within a range of the background area and a histogram distribution of the background area; and means for correcting a gradation of the fetched image, in accordance with a decision result of the deciding means.

14. An image processing apparatus according to claim 13, wherein the correcting means includes means for correcting a gradation of the fetched image within a predetermined range of change value, in accordance with a decision result of the deciding means.

15. An image processing apparatus according to claim 13, wherein the deciding means includes means for deciding a sort of the fetched image on the basis of a density having a maximum frequency within the background area and density histograms of right and left areas of background.

16. An image processing apparatus according to claim 13, wherein the deciding means includes means for deciding a sort of the fetched image on the basis of a density histogram corresponding to densities that are lower than a density having a maximum frequency within the background area.

17. An image processing method comprising:

fetching an image;

forming a density histogram based on the fetched image;

detecting a background area and a character area corresponding to the density histogram formed by the forming;

deciding a sort of the fetched image corresponding to a first image density frequency having a maximum frequency within a range of the background area and a histogram distribution of the background area; and correcting a gradation of the fetched image, in accordance with a decision result of the deciding.

18. An image processing method according to claim 17, wherein the correcting step includes a step of correcting a gradation of the fetched image within a predetermined range of change value, in accordance with a decision result of the deciding step.

19. An image processing method according to claim 17, wherein the deciding includes deciding a sort of the fetched image on the basis of a density having a maximum frequency within the background area and density histograms of right and left areas of background.

20. An image processing method according to claim 17, wherein the deciding includes deciding a sort of the fetched image on the basis of a density histogram corresponding to densities that are lower than a density having a maximum frequency within the background area.

* * * * *